(12) United States Patent
Brandsma

(10) Patent No.: US 12,156,610 B2
(45) Date of Patent: Dec. 3, 2024

(54) AUTONOMOUS RAPID BATCH BEVERAGE MAKER, SYSTEM AND METHOD

(71) Applicant: NEWCO ENTERPRISES, INC., St. Charles, MO (US)

(72) Inventor: David L. Brandsma, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 635 days.

(21) Appl. No.: 17/291,898

(22) PCT Filed: Nov. 12, 2019

(86) PCT No.: PCT/US2019/060996
§ 371 (c)(1),
(2) Date: May 6, 2021

(87) PCT Pub. No.: WO2020/097623
PCT Pub. Date: May 14, 2020

(65) Prior Publication Data
US 2022/0000306 A1 Jan. 6, 2022

Related U.S. Application Data

(60) Provisional application No. 62/758,490, filed on Nov. 9, 2018.

(51) Int. Cl.
*A47J 31/32* (2006.01)
*A47J 31/00* (2006.01)
(Continued)

(52) U.S. Cl.
CPC .......... *A47J 31/525* (2018.08); *A47J 31/007* (2013.01); *A47J 31/32* (2013.01); *A47J 31/36* (2013.01);
(Continued)

(58) Field of Classification Search
CPC .......... A47J 31/32; A47J 31/36; A47J 31/085; A47J 31/401
(Continued)

(56) References Cited

U.S. PATENT DOCUMENTS 2,827,845 A * 3/1958 Richeson .............. A47J 31/007
99/302 R
3,446,137 A * 5/1969 Pryor et al. .......... G07F 13/065
99/289 R
(Continued)

*Primary Examiner* — Reginald Alexander
(74) *Attorney, Agent, or Firm* — Matthews Edwards LLC

(57) ABSTRACT

An autonomous beverage maker, system and method for fresh brewed coffee, tea, and other beverages, responsive to sensed demand or inputted command, makes an initial beverage extract concentrate in a turbulent manner under unpressurized conditions, and then a dilute/secondary extract under pressurized conditions and mixes the initial extract and dilute to complete a beverage batch, successive secondary extracts/dilutes being made as required or desired to meet flavor, strength, etc., successive batches being rapidly made as required to meet demand, maintain level, etc. A parameter or parameters within a receiving or dispensing container is/are autonomously monitored to determine level, demand for additional beverage, beverage age, and or/other information, and responsive to the monitored information or an inputted command, the beverage maker autonomously adapts the beverage making operation or executes predetermined steps, such as, but are not limited to, making more or fewer beverage batches, or signals to dispose of existing beverage.

37 Claims, 17 Drawing Sheets

(51) Int. Cl.
*A47J 31/36* (2006.01)
*A47J 31/40* (2006.01)
*A47J 31/42* (2006.01)
*A47J 31/44* (2006.01)
*A47J 31/46* (2006.01)
*A47J 31/52* (2006.01)
*A47J 31/60* (2006.01)

(52) U.S. Cl.
CPC ............ *A47J 31/401* (2013.01); *A47J 31/42* (2013.01); *A47J 31/4407* (2013.01); *A47J 31/461* (2018.08); *A47J 31/60* (2013.01)

(58) Field of Classification Search
USPC .................................................. 99/323.1, 287
See application file for complete search history.

(56) References Cited

U.S. PATENT DOCUMENTS

| | | | | | |
|---|---|---|---|---|---|
| 4,873,916 | A | * | 10/1989 | Piscaer | A47J 31/18 99/287 |
| 4,967,647 | A | * | 11/1990 | King | A47J 31/32 99/287 |
| 5,297,472 | A | * | 3/1994 | Suzuki | A47J 31/408 99/289 T |
| 8,286,547 | B1 | * | 10/2012 | Lassota | A23F 5/18 99/283 |
| 10,779,675 | B2 | * | 9/2020 | Ford | A47J 31/06 |
| 11,503,942 | B1 | * | 11/2022 | Burrows | A47J 31/20 |
| 2011/0076371 | A1 | * | 3/2011 | Deolarte | A47J 31/401 426/433 |
| 2016/0058241 | A1 | * | 3/2016 | Tsutsumi | A47J 31/5251 99/283 |

* cited by examiner

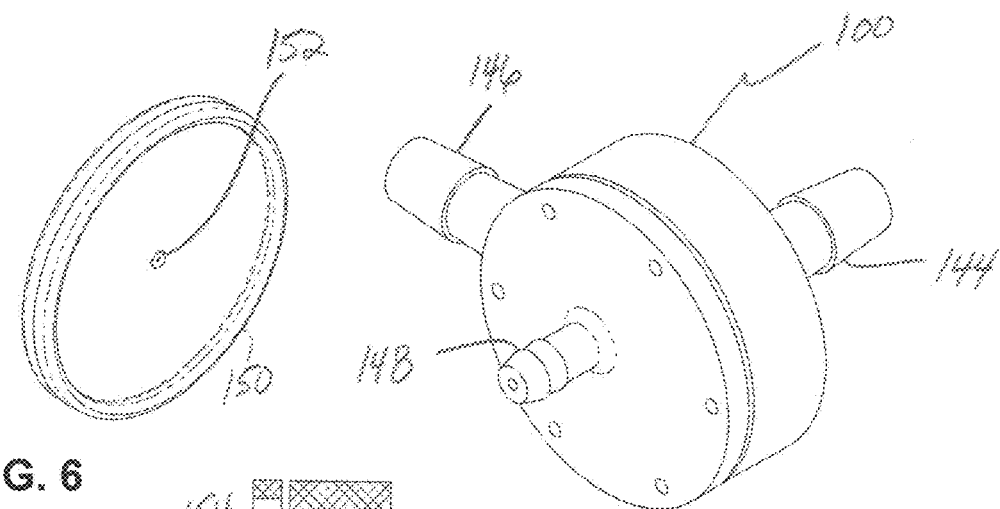
FIG. 6
FIG. 5
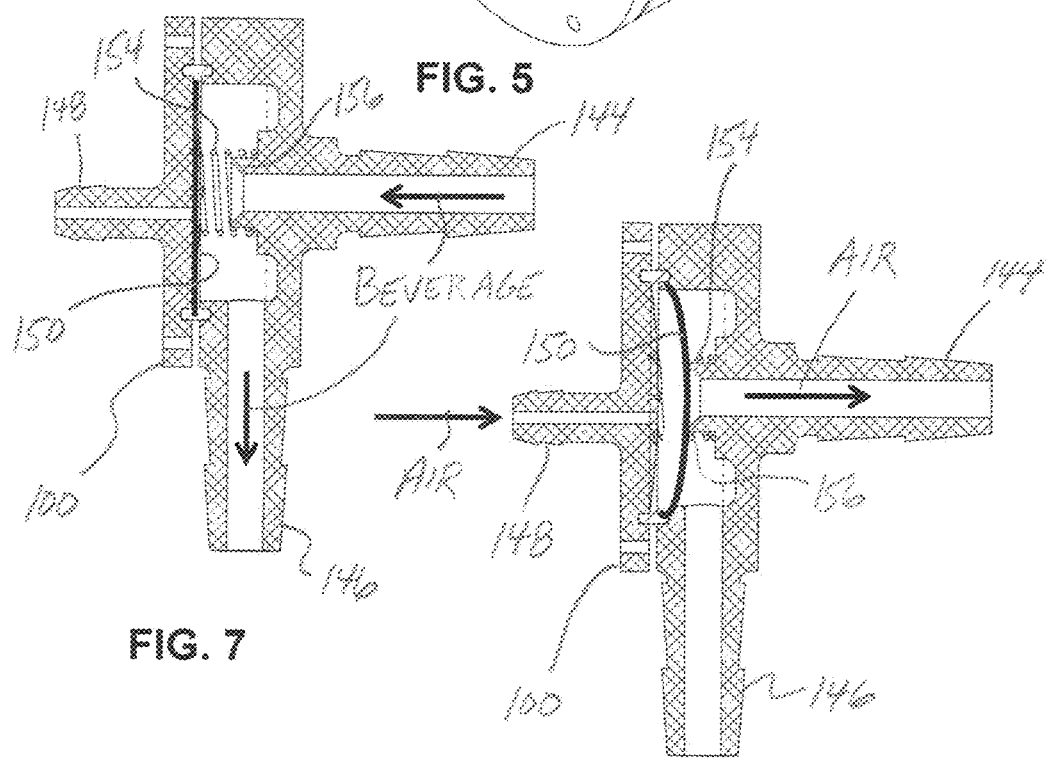
FIG. 7
FIG. 8

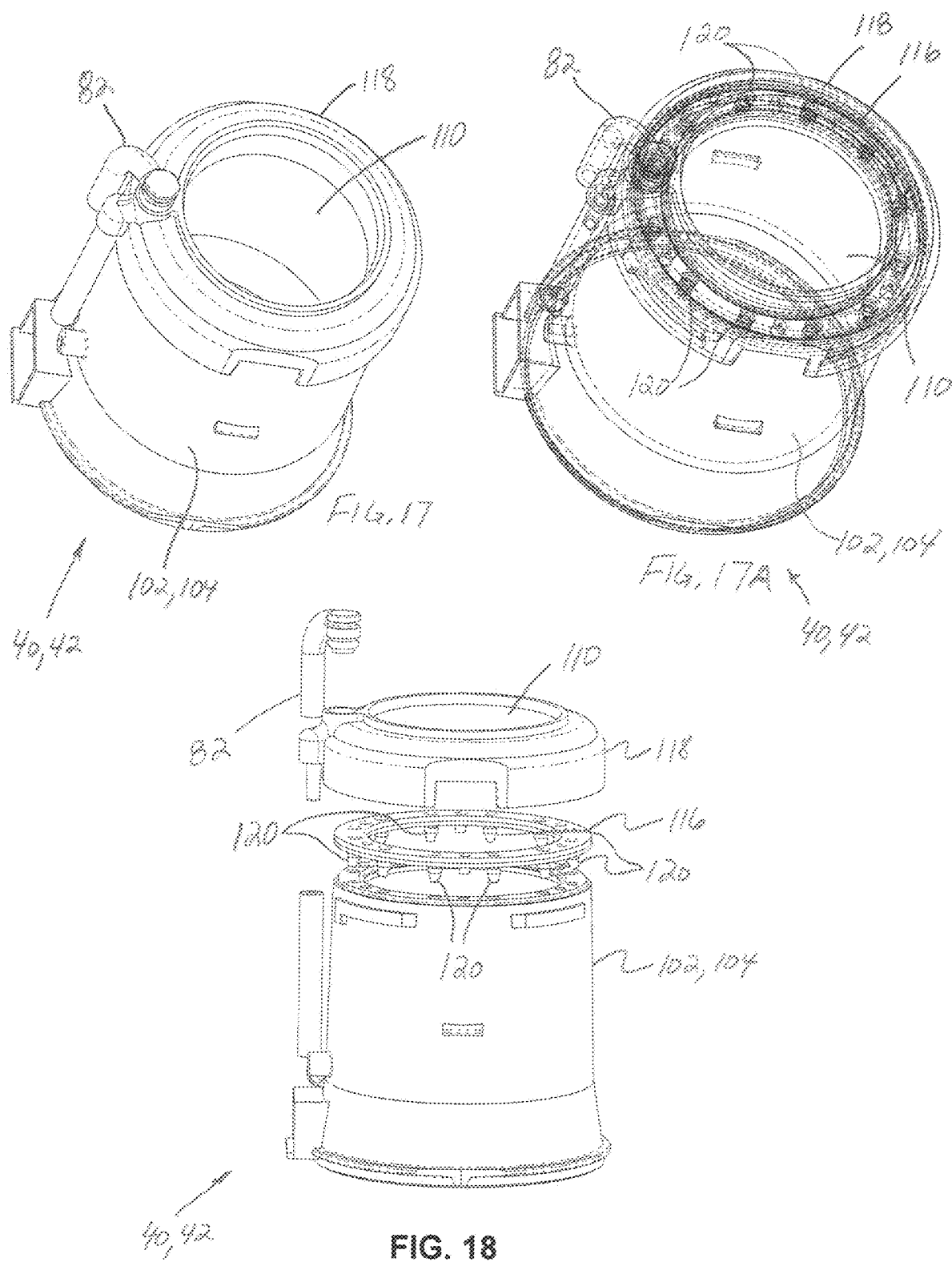

AUTONOMOUS RAPID BATCH BEVERAGE MAKER, SYSTEM AND METHOD

This application is submitted under 35 U.S.C. 371 claiming priority to PCT/US2019/60996, filed Nov. 12, 2019, which application claims the benefit of U.S. Provisional Application No. 758,490, filed Nov. 9, 2018.

TECHNICAL FIELD

The invention relates generally to an autonomous beverage maker, system and method for fresh brewed coffee, tea, and other beverages, and more particularly, that responds to sensed demand or inputted command, utilizes a two or multiple phase method involving first making an initial beverage extract concentrate in a beverage making device of the beverage maker in a turbulent manner under unpressurized conditions that facilitates rapid extracting and degassing, and then making a more dilute secondary extract in a second manner under pressurized conditions that also mix the extracts to complete the batch, successive additional extracts or batches being rapidly made if required or desired to meet demand, flavor, strength, etc. As another aspect, a parameter or parameters of the beverage within a receiving or dispensing container is/are autonomously monitored to determine level, demand for additional beverage, beverage age, and or/other information, including whether multiple servings or single, and the beverage maker, responsive to the monitored information or an inputted command, autonomously adapts the beverage making operation or executes predetermined steps, such as, but are not limited to, making more or less beverage batches, disposing of existing beverage, or the like.

BACKGROUND ART

The disclosure of U.S. Provisional Application No. 62/758,490, filed Nov. 9, 2018, is hereby incorporated herein in its entirety by reference.

A popular coffee brewing system used in many locations, such as convenience stores and gas stations, is a traditional drip coffee brewer in which a measured amount of preground coffee is placed in a brew basket which has been lined with an appropriate paper coffee filter, the coffee being manually started to automatically deliver a certain amount of a liquid brewing medium, e.g., water, for each batch of coffee produced. The coffee is typically dispensed into a dispensing decanter which generally has a manual dispensing valve operated by a handle that the consumer manipulates to fill his or her coffee cup or other drinking container.

A disadvantage of the known traditional drip brewers is the time required to brew a large batch of coffee during high volume periods such as during morning rush hour, after church services, lunch, etc., for convenience stores, restaurants, cafes, etc., before boarding and after deplaning and debarking times in airports, train stations, and the like. These periods can require the brewing of multiple large batches of coffee as quickly as possible. Having to wait for the coffee to finish brewing can lead to lowered customer satisfaction and lost sales.

As another issue, inherent to the brewing process is that most of the coffee flavor is extracted from the grounds in the first few seconds of the brewing cycle in a concentrated form and is typically immediately dispensed at that time because the drain of the brewing basket is always open. The intent is that the initial extract is diluted as the brewing cycle continues, but if customers or users draw coffee from a holding decanter that receives the coffee early during the brewing process before the batch of brew is complete and the initial extract is not fully diluted, the coffee they receive will be more highly concentrated and thus too strong, which may be deemed by some customers as being of poor quality. Then the rest of the coffee of that batch drained from the basket into the decanter can also be of poor quality, but is the opposite, that is, it is too weak. So the coffee quality will be inconsistent, potentially leading to customer dissatisfaction.

As a proposed remedy, many popular brewing cycles rapidly deliver the entire quantity of liquid medium, e.g., hot water, to fully immerse the grounds in the hot water in the brewing basket, and provide a small drain opening so that the coffee is more slowly drained. However, this has been found to still be too slow for some high demand retail environments, and the demand for coffee can exceed supply during busy periods so that customers may be required to wait for another brew cycle to be completed to receive their coffee. If the beverage is to be dispensed with food, and the food is ready before the coffee, the server may delay delivering the food while waiting for coffee so that the food is cold when received, or the coffee may be served when ready, after the food has been delivered, neither of which provides the desired service. Some consumers also find the flavor of coffee brewed using the full immersion technique to be less desirable. One possible reason for this could be that the coffee grounds are not allowed to "bloom", that is, outgas gases including carbon dioxide to the atmosphere, at the beginning of the brewing cycle, which outgassing has been observed to provide a smoother taste, which can be a critical decision factor for many consumers.

Another of the disadvantages of the traditional drip coffee brewer when used commercially is the problem of disposing of the spent grounds and used filter from the brew basket, and the employee time required for inserting a new coffee filter into the basket, procuring and opening a sachet or other container of pre ground coffee which is poured into the brewing filter, re-inserting the brew basket into the coffee machine and manually initiating the coffee brewing sequence to refill the holding or dispensing container.

Shortages of coffee during peak periods of convenience stores, cafes, coffee bars, and restaurants can be remedied by using multiple brewers, but this requires greater capital expenditures and counter space, which is then not productive when the additional capacity is idle. Still another shortcoming of large batch brewing is when a full decanter of coffee is brewed and the demand has dwindled after a normal rush period and the stale coffee must be disposed of. This is multiplied by the use of multiple brewers, as is the cleaning time and maintenance. While it is possible to brew a smaller batch of coffee during periods of low demand, multiple sized sachets of coffee would need to be kept in inventory for brewing the smaller batches or the coffee would have to be hand measured for a particular batch to be brewed, which would be time consuming and subject to errors.

It is known to use a mechanical apparatus that can speed the extraction and draining of coffee from a brewing chamber. Familiarly, French presses and similar devices use a piston or plunger in cooperation with a filter, to press or draw the coffee water mixture or slurry within a brewing chamber through the filter to be ready to serve. However, this requires numerous moving parts, including large seals, in contact with the coffee as it is brewed, with attendant cleaning, maintenance and service requirements. Reference as representative in this regard, King U.S. Pat. No. 4,967, 647, which utilizes various embodiments of pistons for pressing and also for agitating the coffee slurry in combination with air injected into the path of the piston.

Reference also, Bishop et al. U.S. Pat. No. 8,998,176, issued to Bunn-O-Matic Corporation, which mentions pressurization of a beverage making or brewing chamber in various manners, including under positive or negative pressures, including in a pulsing manner to improve extraction, mixing, and draining. As an example, a pressure differential, e.g., a higher pressure over the coffee slurry and a lower pressure in a drain region below a filter, is disclosed that forces the liquid coffee through the filter and into the drain to speed the beverage making and delivery to a holding container. In a variant, after dry coffee grounds are deposited in the bottom of a brewing chamber, liquid is added, and a pulsing low pressure condition can be generated in the upper region of the brewing chamber above the filter to cause higher pressure atmospheric air to flow upwardly through a drain and through a filter and slurry of the coffee and water to better mix and extract flavoring elements and the like from the grounds. Sometimes the grounds will have a tendency to float on the liquid, and it is also disclosed to create a higher pressure condition in a space within the chamber above the liquid as an attempt to force the grounds to mix with the liquid and to improve extraction. Still further, it is disclosed that air can be diverted into the drain region below the filter to create a higher pressure that can bubble up through the filter. However, the drain region is also open to the receiving container and thus the higher pressure generated would be required to be sufficient to maintain the slurry on the opposite side of the filter until it is desired to filter out and collect the coffee. As another observation, executing the steps of the brewing process consecutively, including pulsing and having to pressurize a relatively large open region of a brewing chamber, can be too time consuming when coffee demand is high.

Reference also, Bishop et al. U.S. Pat. Nos. 8,997,633 and 9,993,105 issued to Bunn-O-Matic Corporation; and Bishop et al. International Patent Publication WO 2018/111972 A1, owned by Bunn-O-Matic Corporation, which disclose variants that use positive pressure air or gas to pressurize a cavity below the filter holding the coffee slurry, to create bubbling through the filter into the coffee slurry. Various operational combinations of positive pressure under and negative pressure over, and higher pressure over and lower pressure under, the coffee slurry are again disclosed for extracting flavor and dispensing the coffee. However, the basic operation disclosed in the referenced Bishop et al. patents and international publication is to deliver ground coffee and water, and optionally employ the various pressure control schemes to extract coffee flavor while preventing premature drainage. In the case of the international publication, a holding container below the filter is required to be both sealed and pressurized to generate the bubbling. This again can be time consuming, particularly when the holding container is large and/or largely empty.

As a further shortcoming of having to pressurize the holding container to generate bubbling as disclosed in International Patent Publication No. WO 2018/111972 A1, if the holding container is removed or the seal between the holding container and the filter is lost, the bubbling will cease or be substantially reduced, and there must be a lower pressure condition above the filter to prevent loss of the coffee through the filter. Also, if it is attempted to dispense coffee from the holding container while pressurized, e.g., the pressurization can be undesirably reduced to disrupt the brewing process.

Thus what is sought is a manner of making a beverage, including but not limited to, a brewed coffee or tea, that overcomes one or more of the shortcomings, limitations, and disadvantages discussed above.

SUMMARY OF THE INVENTION

What is disclosed is an autonomous rapid beverage maker, system, and method, including for making a beverage such as, but not limited to, a brewed coffee or tea, that overcomes one or more of the shortcomings and limitations discussed above.

According to a preferred aspect of the invention, responsive to sensed demand or inputted command, a two or more phase autonomous method is employed, involving first making a concentrated initial beverage extract in a beverage making or brewing device in first manner under unpressurized conditions that facilitates the extracting high quality flavor components and degassing, and then making a secondary extract in a second manner under pressurized conditions that facilitate flow of the high quality extracts from the beverage making substance and achieves some further extraction, and mixing the two extracts to complete the batch, with successive extracts and/or batches being automatically rapidly made as required to meet parameters such as dilution level, beverage demand, receiving container level, etc. Making smaller batches in this manner has been found to enable maintaining more precise control of the process and beverage quality, a more rapid process, and continued use of the receiving container. Particularly in regard to the critical initial extraction of flavor from the beverage making substance or substances (herein interchangeably and collectively referred to in the singular), for coffee as an example, comprising ground coffee beans either alone or with additives such as chocolate, vanilla, hazelnut, etc.; and for tea, the ingredients being tea leaves in at least a partially fragmented state, alone or with an additive, e.g., lemon, mint, spices, herbs, etc., the extraction process of the invention comprises turbulently mixing the grounds or leaves in an advantageous manner with a liquid medium, e.g., water, heated to a precise temperature, typically at or just less than boiling, for just the few seconds required to achieve optimal extraction of the bulk of the quality flavor components of the beverage making substance from the substance.

According to another preferred aspect of the invention, it has been found to best extract the most important flavor components in a more concentrated state very quickly, that is, within just the few seconds of turbulent mixing, so that the liquid medium aggressively contacts and penetrates all surfaces of the grounds or leaf fragments of the beverage making substance, in an unpressurized environment, so that those flavor components, typically comprising oils and very fine solid soluble and insoluble particles, are released from the grounds or fragments by and into the liquid medium, e.g., hot water, while undesired gaseous components, namely carbon dioxide, are simultaneously released to escape to the environment, which is facilitated by the bubbling. A preferred manner of accomplishing this is to bubble air or a gas through the liquid medium in a carefully controlled manner under the unpressurized conditions, in an unsealed beverage making location, so that both substantial agitation of the beverage making substance will occur to achieve maximum contact between the individual particles or fragments of the beverage making substance and the liquid medium for desired release of extracts, and the gases contained in the grounds to escape, all within the several seconds. It has been found that this initial extraction can be satisfactorily achieved as the beverage making substance or substances is/are delivered to the beverage making location, e.g., a chamber within a beverage making housing or vessel of the beverage making device having a filter for separating the extract from the remaining beverage making substance(s), before having time to settle, which has been found to save time and allow filtering of the extract concentrate from the beverage making substance(s) before the beverage making substance(s), particularly remaining fines, settle against the filter to possibly slow the extraction and filtering.

As another preferred aspect of the invention, to facilitate agitation and prevent significant settling, the liquid medium has been found to be best introduced peripherally about the beverage making chamber simultaneously with the introduction of the beverage making substance more centrally, so that a pattern of turbulence and resulting agitation is achieved in combination with the introduction of air through the filter. Thus it can be envisioned that as the particles of the beverage making substance are entering a main mixing and extraction region of the beverage making chamber through a central opening so as to approach the filter, the liquid medium is entering about the periphery so as to flow over the filter, and the air is passing through the filter into the main mixing region so as to bubble toward and receive and envelope the incoming beverage making substance to effectively instantly wet the individual particles or fragments to immediately commence the extraction of flavor components. The further bubbling creates a beneficial turbulence for agitating the mixture and extracting the flavor components.

As another preferred aspect of the invention, the bubbling is created by a flow of air directed through a drain or beverage delivery conduit connected to a drain or collection region of the beverage making chamber, so that the filter will spread and diffuse the air as bubbles that will flow at least generally evenly across the extent of the filter into the main mixing region of the chamber containing the beverage making substance so that immediate agitation and mixing of the incoming beverage making substance with the incoming liquid medium over a widespread area will occur and the beverage making substance will be suspended in the liquid medium by the bubbling to better achieve the extraction and degassing functions. This will also serve to delay settling.

According to another preferred aspect of the invention, the secondary extraction/dilution occurs by introducing an additional quantity of liquid medium, e.g., hot water, into the beverage making chamber, in a manner that achieves agitation and mixing to again maximize contact between the individual particles of the beverage making substance and the liquid medium. Here, as the bulk of any gases have already been removed, pressurization, at least for an initial period, is advantageous to facilitate the absorption or penetration of the liquid medium into the particles, e.g., grounds, leaf fragments, which, with agitation, will facilitate further extraction of flavor components to some extent. In this regard, using coffee as an example beverage making substance, the beans are about 70 percent fiber, and about 30 percent or less desirable extractable flavor components, and it has been found that by using the process of the present invention a greater overall percentage of the flavor components can be extracted by subsequent dilution or dilutions, although the very rapid initial extraction provides the greatest concentration extraction and the best quality extract. For some applications, it is recognized that it may be undesirable to extract much of the lesser quality flavor elements, and thus, the second and any subsequent extractions/dilutions can be constituted more for dilution as opposed to extraction.

As a preferred aspect of the invention with regard to pressurization, the opening through which the beverage making substance is introduced into the main beverage making chamber is closed during at least a portion of the introduction of the additional quantity of the liquid medium so that the added liquid will reduce the available interior volume within the chamber for the existing air, to thereby compress that air and increase the pressure within the chamber. This advantageously eliminates the need for time for pumping to pressurize the chamber such as when the beverage making substance and the liquid medium are both already present in the chamber when the pressurization is commenced. The drain (which is preferably relatively small in sectional extent) can be closed so as to sustain the pressure. As an optional step, an air pump or other pressurized air or gas source can be utilized to maintain or increase air pressure in the main mixing region of the beverage making chamber while the drain is open, to facilitate and speed draining of the liquid through the filter from the chamber. The introduction of the additional quantity of liquid medium and associated turbulence and agitation will also act to suspend the particles of the beverage making substance in the liquid medium at least largely until the drain is opened, so that the liquid extract will more quickly pass through the filter largely unencumbered by fine particles clogging the small filter passages thereby further reducing the beverage making time. At one or more times during the secondary extraction phase, air can be directed through the drain into the drain region of the chamber and diffused through the filter into the main region to reduce or prevent settling on the filter and lodging in the filter passages, to also reduce beverage preparation time. This can be done on a scheduled basis, or as needed responsive to a signal representative of reduced flow or fill of the receiving container.

According to another preferred aspect of the invention, as introduced above, the individual beverage batches are preferably smaller than the capacity of a receiving container, such as a decanter or urn used for dispensing the beverage, e.g., a fraction of the volume, as it has been found that making multiple precise smaller batches can achieve a higher quality beverage than making one large batch. One reason for this is that each initial extraction step involves smaller quantities of beverage making substance and liquid so that conditions for extraction are more closely controllable. Also, dilution of the concentrated initial extract can be more closely controlled, as can be the manner of mixing the dilute with the initial extract. Also, the making of the batches is desirably in concert with monitoring of a condition or conditions in the receiving or dispensing container to determine need or demand for replenishing beverage, which condition or conditions can include, but are not limited to, remaining beverage level or quantity (mass or volume), beverage outflow from the container, time, and/or age of the beverage in the container, and the like. The monitoring can be on a continuous or periodic basis and can include changes due to inflow of fresh beverage, including the rate, so that the number of batches of new beverage can be accurately gauged to demand or need. Thus, the volume of beverage made and when it is made can be more closely tailored to usage. As a variation, the invention contemplates that a single serve station that can be optionally used wherein the batch volume will be matched to the single serve receiving container, e.g., a cup.

According to another preferred aspect of the invention, a multiple port valve arrangement in connection with an outlet or drain of the beverage making or brewing chamber and a source of pressurized air or gas, is automatically operable in a first state to close the drain path to the receiving container and direct a flow of the pressurized air or gas in a reverse direction through the drain into an initial quantity of the liquid medium entering or disposed in the chamber while the chamber is open for introducing a beverage making substance or substances into the main or mixing region of the chamber so as to contact the liquid medium, to agitate and mix the liquid medium and beverage making substance or substances to create the concentrated initial beverage extract. Closure to the receiving container also allows use of less pressurized air or gas for bubbling. The operating state of the multiple port valve arrangement is then automatically changed to open the path to the receiving container to allow the initial extract to flow in the normal direction through the drain as or just before the rest of the liquid medium is introduced into the chamber, optionally accompanied by closing the opening to the main region of the chamber through which the beverage making substance is delivered, and introducing pressurized air or gas into the main region, with the filter disposed between the main region and the drain. This acts to create a pressure differential between the main region of the chamber on one side of the filter and the drain or outlet region on the opposite side, to quickly finish, dilute, and drain the initial extract, followed by the making of the one or more lesser extracts/dilutes that provide some additional extraction along with flushing the more concentrated initial extract from the beverage making substance and diluting it. After the extractions/dilutions, the remnants of the process are automatically discarded, the process being repeatable in an autonomous manner to make additional batches as required responsive to demand and/or for maintaining a desired level in a receiving container, including as various quantities of the beverage are being dispensed from that container, or other controlling factor or condition.

As another preferred aspect of the invention, for replenishing the receiving container during use, it can include a sensor or sensors to identify beverage level, volume, mass, dispensed amount, or other indicator of need for an additional batch or batches of the beverage. As another option for brewed beverages such as coffee and tea, the beverage maker can include, or receive, ground beverage making substance from an associated bean or leaf grinder which can be automatically controlled by a controller.

As another preferred aspect for brewed coffee, the beverage maker can include a coffee bean storage container which holds enough coffee beans to produce multiple batches of brewed coffee, the beans being dispensed automatically, e.g., via gravity and/or mechanically, as needed into the bean grinder. As a non-limiting example, the beans are ground and dispensed in timed relation to delivery of the initial quantity of the liquid medium, e.g., hot water, responsive to receipt by the controller of a signal from a sensor associated with a coffee receiving container such as a dispensing urn or carafe, indicating that an amount of coffee corresponding with one or more batches has been dispensed.

As another optional aspect of the invention, the beverage maker can comprise multiple beverage making substance containers or dispensers, e.g., coffee bean or ground coffee storage container and grinder (for beans), tea dispenser, etc., that can be automatically selected for delivering a quantity of the beverage making substance to the beverage making chamber, under control by a central controller. This arrangement would permit multiple flavors or types of coffee and/or tea to be available on demand to the consumer.

As an option, the bean grinder can be replaced or accompanied by a conveyor, such as, but not limited to, an auger driven canister holding pre-ground coffee. The delivery of the coffee to the beverage making chamber is controlled by a controller to operate the auger to deliver a predetermined quantity of the ground coffee, e.g., dropping by gravity into the beverage making chamber through the opening. Alternatively or additionally, an auger driven canister can contain cut, torn, or whole dried tea leaves to brew fresh hot tea, to be delivered automatically by the same or an additional conveyor.

As another option, a remote control connected by a suitable conductive path to the beverage maker controller, e.g., via internet or wired or wireless LAN, Bluetooth or near field communications, can be used to monitor beverage levels, beverage mass or weight, and/or another suitable parameter or parameters, and/or dispensing and input commands to the beverage maker for replenishment as desired.

As a preferred embodiment of the beverage making device of the beverage maker, a suitable liquid medium delivery mechanism comprises a spray dome, ring, or other annular or peripheral conduit having openings or outlets disposed to deliver the liquid medium in a distributed manner about the periphery of the interior of the beverage making chamber. The spray dome or ring will extend about a centrally located opening through which the beverage making substance will be dispensed into the interior. As a result, the liquid medium and beverage making substance can be simultaneously delivered, so as to mix at a desired location within the main mixing region of the chamber in the above described manner. Also preferably, the liquid medium will be delivered in a manner to rinse or clean a sidewall extending about and enclosing the beverage making chamber for removing remnants of beverage making substance therefrom, at appropriate times, such as at the end of a batch. The direction of the liquid medium flow at this point is also preferably sufficient to collect or compact the remnants, now waste, on the filter, to facilitate removal of the waste from the chamber. The filter preferably comprises a porous or perforated platform or bed, the pores or perforations of which are sized to prevent passage of particulates of the beverage making substance above a specified size to pass through to the drain, while allowing air to bubble through and the extract to pass to the drain. As a preferred option, the filter platform or bed can be removed automatically, e.g., raised and lowered, relative to the beverage making chamber, to facilitate removal of the waste particulate matter remaining after the beverage making process. The drain opening or outlet will be disposed in connection with a drain region of the beverage making chamber, with the filter platform or bed between that region and the main beverage making region. The drain is connected to a collection tube leading to the receiving container for the beverage. A multi-port valve arrangement is disposed between the drain opening and the receiving container, is connected with a pressurized air source, such as an air pump. The valve arrangement is operable in a first state as discussed above to prevent flow from the beverage making chamber to the receiving container while directing a flow of pressurized air (or a gas) into the drain region of the chamber, so as to pass through the filter into the main beverage making region as bubbles through the liquid medium.

In one form of the present invention, a coffee brewing system for brewing a batch of coffee is comprised of a coffee bean storage container which holds enough coffee beans to produce multiple batches of brewed coffee, the beans being dispensed, e.g., by gravity or mechanical feed as needed into a bean grinder which is controlled by electronic signals generated from a microprocessor based controller. The beans are ground and dispensed into a specially designed coffee brewing chamber of a brewing device of the beverage maker which processes the ground coffee into freshly brewed liquid coffee in small batches which are stored in a specially designed storage decanter or decanters containing a liquid sensing mechanism which is in communication with the controller which operates the system to maintain the coffee volume in the decanter or decanters at a predetermined level.

Another form of the present invention comprises the aforementioned brewing system in two or more configurations controlled by one or multiple microprocessor based controllers. This arrangement would permit multiple flavors or types of coffee to be available on demand to the consumer.

Another form of the system replaces the bean grinder with a mechanical feeder such as an auger driven canister which would hold pre-ground coffee as opposed to a bean grinding system. The delivery of the coffee to the coffee brewing chamber in this configuration is controlled by the same controller or a different microprocessor based controller in communication with the brewer and coffee storage container which controls an auger in the canister to deliver a predetermined amount of ground coffee dropping by gravity or fed into the brewing chamber.

Another form of the system using aforementioned canister system replaces the ground coffee with cut, torn or dried tea leaves, to brew fresh hot tea. The brewing chamber for the tea delivers hot tea to a decanter as described or into a portable decanter to process into an iced tea drink.

Another form of the invention uses a remote control through wired, internet or wireless communication means to monitor and control the coffee dispensing mechanism including control of the liquid level in the dispensing decanter(s).

The present invention in a preferred embodiment provides a device for brewing coffee or tea that is configured to facilitate a reduction of the time normally required to dispense, steep and brew coffee. The coffee brewer is preferably comprised of a water spray ring or dome above a central tube shaped brewing chamber of the brewing device. The floor of the brewing chamber has a porous bed which acts as a filter medium, e.g., comprises a coffee bed, to filter and separate the liquid extract from particulate matter during the brewing process. The coffee bed can be raised or lowered to facilitate removal of the waste particulate matter leftover from the brewing process and is coupled with a drain or collection conduit or tube leading to the storage container for the brewed beverage. Between the brewing chamber and the beverage decanter, a multi-port valve arrangement or apparatus with a diaphragm coupled in the brewed coffee drain conduit is used to reduce the normal brewing time. In one embodiment, when the air pump in this configuration is activated, an internal diaphragm is forced against a delivery port connecting with a receiving container or vessel, acting as a check valve. While closing the delivery port, an air escape port is opened allowing the compressed air to flow backwards into the drain tube conduit and into the brew chamber. The brewing chamber is in an initial position ready to receive ground coffee, the coffee brewing bed is in the raised position and seated and sealed to the brewing chamber to allow liquid drainage to communicate with the liquid delivery tube and the storage decanter. When the air pump attached to the multi-port valve arrangement is activated and compressed, air is forced up the delivery tube, hot water can be released from the spray ring or dome which mixes with the compressed air causing a bubbling effect. At this time, the grinder or auger energizes so ground coffee or tea can be gravity dispensed simultaneously through the center of the brewing chamber with the hot water delivery surrounding the sidewall of the brewing chamber. Ground coffee or tea is immediately and simultaneously mixed with the bubbling mixture of hot water and air resulting in an aggressive and accelerated extraction of the desired beverage. Once this mixing has taken place, the air pump controlling the multiport valve arrangement is de-energized, allowing liquid to flow from the brewing chamber through the drain conduit to the delivery conduit into the receiving decanter. The brewing chamber center opening is then mechanically sealed, and a mixture of hot water and compressed air is introduced into the chamber forcing the brewed beverage out of the brewing chamber into the drain conduit and through the delivery tube into the receiving decanter. Near the end of the brewing cycle, the hot water delivery is de-energized, and the compressed air pump is left on, to continue forcing leftover beverage out of the brewing chamber through the filter medium into the delivery tube and out into the receiving decanter. The cycle is completed when the air pump is de-energized, and the brew chamber opens and depressurizes, allowing a wiper, rake, or comb to clear off by wiping action, the residual coffee grounds or tea leaves into a disposal area.

As a preferred alternative to the air pump operated multiple port valve arrangement, a valve arrangement comprising a solenoid or other servo operated valve or valves, in conjunction with an air pump, can be used.

The present invention can also utilize a specially designed dispensing decanter which is electronically linked to the central controlling brewer microprocessor based controller by means of a quick disconnect or wireless connection. The specialized decanter also is equipped with a series of reed switches or similar sensing devices which are positioned at different height levels or ladder levels on the outside surface of the liquid decanter holding tank.

The specialized decanter of the invention can further employ a magnet or other detectable element coupled to a floating cover which not only gives the reed switch ladder sensing device a magnetic signal to relay to the microprocessor, but also covers over the liquid to keep the flavor and essential oils and heat from evaporating into the air and escaping when the liquid beverage is dispensed and the volume of beverage is replaced by the incoming fresh air entering the top of the decanter.

The present invention facilitates totally automated control of the coffee brewing process in fast paced environments such as convenience stores and gas stations where there are periods of heavy beverage purchases followed by periods of slow usage.

The present invention reduces or eliminates the hazard of employee burns by eliminating the possibility of removing a brew basket full of hot liquid and associated spill hazard.

The present invention reduces the amount of wasted stale discarded beverage by electronically monitoring and adjusting the liquid level in the dispensing decanter to keep fresh product available to the consumer.

If the brewer of the present invention is positioned on a counter or other support structure with a hole through the counter waste material from the brew process can be disposed of in a large waste container underneath the counter eliminating the need to manually discard grounds or leaves as is traditionally required with a drip brewing process.

The present invention eliminates the need to use a paper filter to process the coffee or tea brewing process as is traditional in the industry.

The present invention brews by constantly refilling the dispensing decanter in continuous small batches which results in constant mixing of the fresh coffee or tea, eliminating the problem of conventional basket brewing in large batches which can result in the consumer drawing highly concentrated beverage from the start of the brew process, disrupting the desired coffee strength for the rest of the batch.

BRIEF DESCRIPTION OF THE DRAWINGS

FIG. 5 is an overall illustration of one embodiment of a multiple port valve arrangement of the representative beverage making device constructed to divert liquid flow and produce agitation by introduction of compressed air against an internal diaphragm or membrane of the valve arrangement.

FIG. 6 is a view of the membrane centrally mounted in the valve arrangement pictured in FIG. 5 which flexes when compressed air is introduced against the surface or a solenoid or other driver is actuated, and also allows compressed air to bleed through the central hole in the membrane into a drain conduit.

FIG. 7 is a cross-sectional view of the valve arrangement shown in a normal position allowing liquid flow by gravity therethrough.

FIG. 8 is a cross-sectional view of the valve arrangement shown in an energized position to prevent liquid flow by gravity therethrough and forcing compressed air against liquid flow by gravity.

FIG. 17 is an isometric view of aspects of a representative beverage making device showing the beverage making chamber and dispensing ring above the beverage making or brew chamber and aspects of a liquid medium delivery conduit.

FIG. 17A is another isometric view of the beverage making device of FIG. 17, showing in dotted lines, internal features of the liquid medium delivery conduit and dispensing ring, namely, liquid dispensing orifices thereof.

FIG. 18 is side view of the beverage making device, showing aspects of a cylindrical housing thereof, the liquid medium delivery conduit, and the dispensing ring.

DETAILED DESCRIPTION OF PREFERRED EMBODIMENTS OF THE INVENTION

Figure 1:
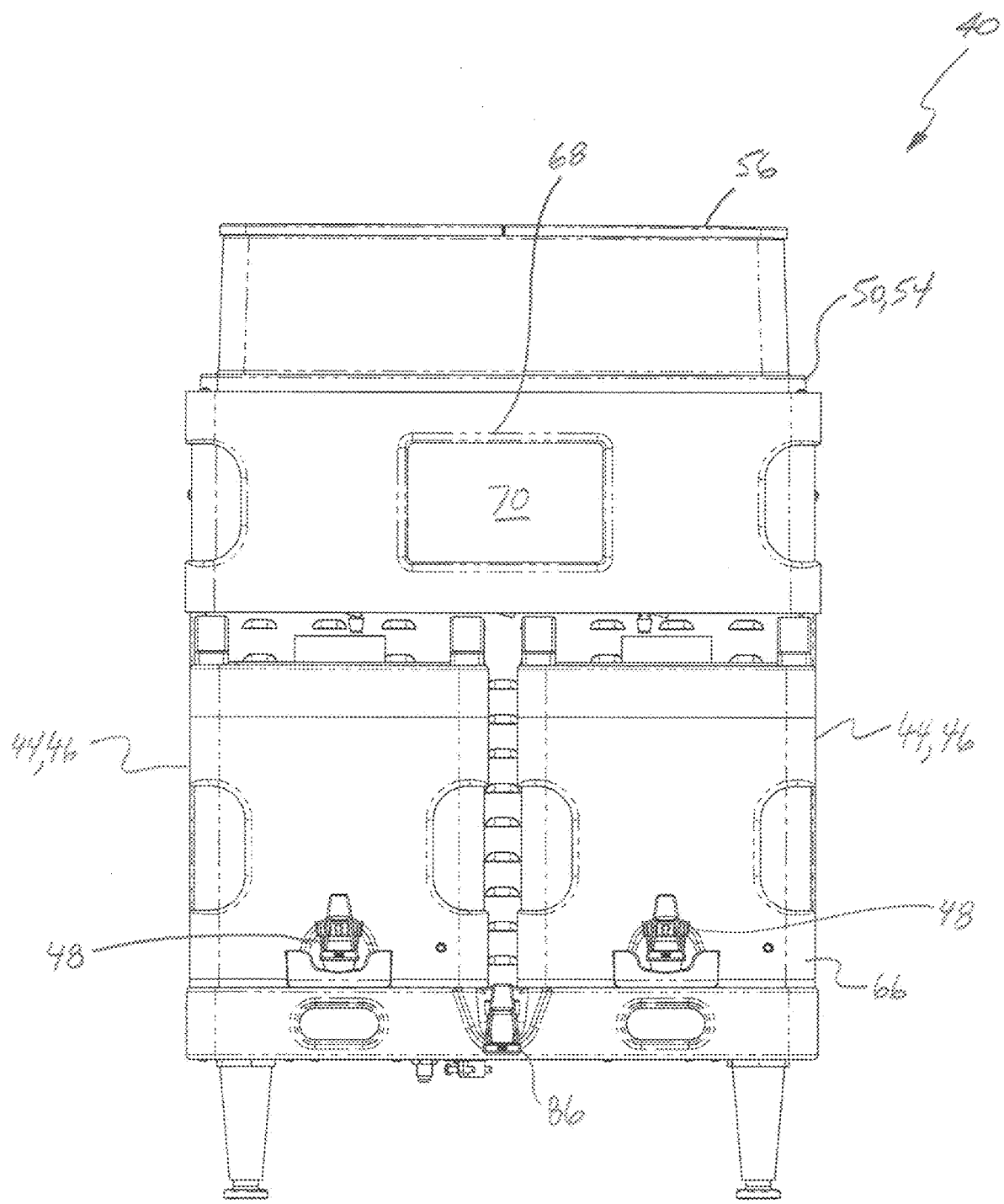
FIG. 1 is a frontal view of a representative beverage maker and system of the invention, configured representatively for autonomous brewing and replenishing coffee in two independent brewing devices of the maker using whole roasted coffee beans which are ground and brewed in small batches and stored in respective storage and dispensing containers, according to aspects of methods of the invention.
Figure 2:
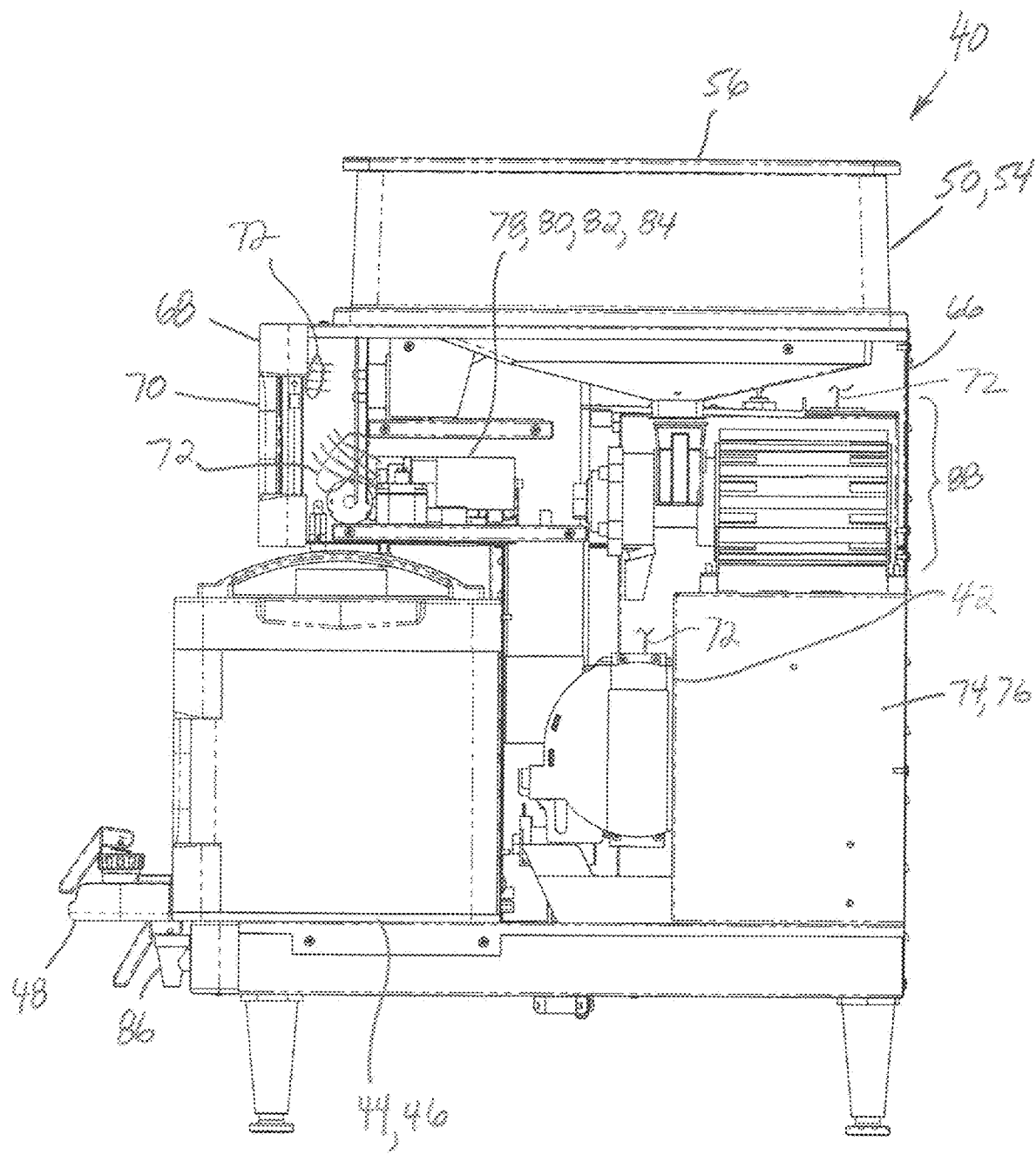
FIG. 2 is a side view of the beverage maker shown in FIG. 1 with side covers removed to expose the components, including bean storage hoppers, a bean grinder, a bean detector, a beverage making device which is a coffee brewer, pumps and liquid controls, and a beverage storage/dispensing container.
Figure 3:
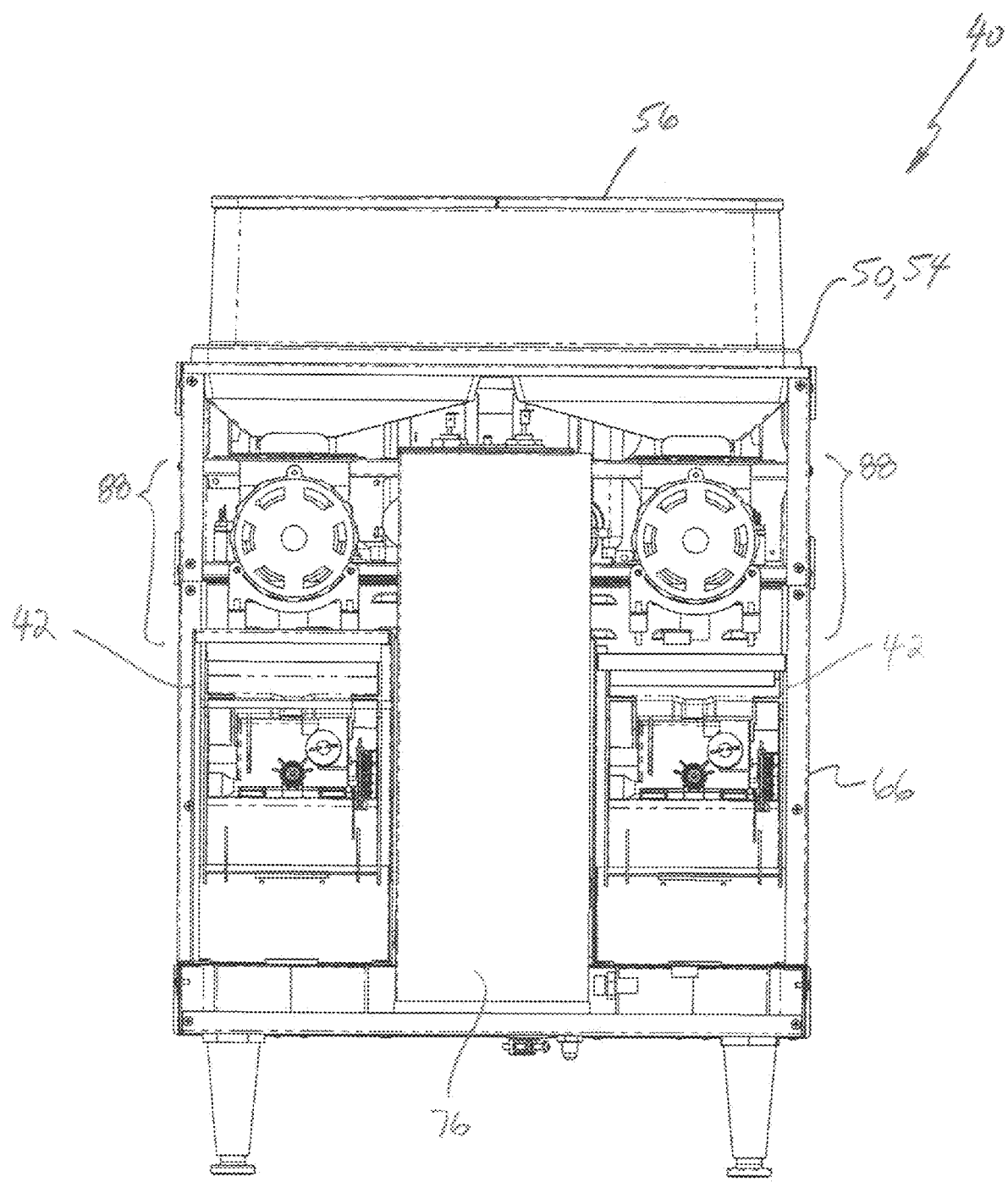
FIG. 3 is a rear view of the beverage maker with back covers removed to expose the component in the rear of the cabinet. This image shows the two beverage making devices to illustrate the duality of the device and a view of the centralized hot water heating system for supplying hot water to the respective beverage making devices.

Referring now to FIGS. 1-4, a preferred embodiment of a beverage maker and system 40 of the invention is shown. Beverage maker 40 is configured to include two beverage making devices 42 individually autonomously functioning as beverage making stations to make successive small batches of beverages responsive to one or more predetermined conditions or parameters, and discharge or drain the finished batches into an associated receiving and dispensing container 44, which here are serving decanters 46 disposed at each station in side by side relation at the front of beverage maker 40, and having manually operable dispensing faucets 48 on a front thereof usable for dispensing desired quantities of the beverage from the decanters 46, e.g., single serving or table carafe quantities. Beverage maker 40 illustrated and described herein is configured to quickly brew successive batches of substantially uniform quality and consistency coffee or tea, which individual batches are smaller in volume than the volume of the respective decanters 46, for restaurants, cafes, diners, bars, convenience stores, and other locations where employees and/or customers will dispense the coffee or tea from decanters 46 in various quantities also smaller than the volume of the respective decanters 46, but at high rates, e.g., several volumes of the respective decanters 46, over the course of several minutes. Beverage maker 40 does this in a manner so that there is little or no interruption in the dispensing or drop in beverage quality from the respective stations. This is in contrast to larger batch immersion brewers that make the coffee or tea in large volumes that match the volume of the receiving container and take several minutes to make, such that the serving station is largely out of service for the beverage making period, or the beverage quality suffers due to inconsistent concentration of flavoring elements in the beverage if the beverage is dispensed before the brewing cycle is complete. As will be explained, the beverage making using the invention is automatic, responsive to predetermined conditions or parameters such as, but not limited to, sensed dispensing quantities/rates, etc.; receiving container levels; beverage age; and the like, or inputted commands, so that little or no employee time must be devoted to beverage making during busy periods like rush hours and the like.

To eliminate the need to manually supply a quantity of a beverage making substance for each batch, beverage maker 40 includes a source 50 of a beverage making substance 52 for each beverage making device 42, which here, because the beverage is coffee or tea, includes a hopper 54 at the top of maker 40, configured to hold a quantity of beverage making substance 52, e.g., coffee beans, tea leaves; hoppers 54 being jointly contained under a hopper cover 56. For greater freshness, for making coffee, it is desired to use whole coffee beans, and accordingly, each beverage making device 42 includes a bean grinder 58 disposed below associated hopper 54 and connected thereto by a bean chute 60. A bean detector 62 operable to detect the presence of beans in chute 60 or at grinder 58 and output a signal representative thereof, e.g., a pressure pad, switch, or optical sensor, is appropriately located in association with one of those items. Detector 62 can also output a signal when beans are absent or the supply is low. Grinder 58 is of conventional construction and operation responsive to an inputted power signal from a power source, e.g., conventionally connected line power, and will discharge beverage making substance 52, in the form of ground coffee, downwardly therefrom, and includes an optional vibration pad 64 to facilitate downward and complete flow of a batch of the ground coffee. Hopper 54, hopper cover 56, bean grinder 58, chute 60, and detector 62, comprise components of a beverage making substance delivery mechanism 88 of each beverage making device 42, contained within a housing 64 of beverage maker 40, supported by various brackets and fittings. Here, the bean grinder 58 comprises a brewable material driver controllably operable to deliver the brewable material to the beverage making or brewing device.

Here also, it should be recognized and understood that for another beverage making substance, each beverage making device 42, will include suitable beverage making substance holding capacity, preparation apparatus, such as a grinder for tea leaves or the like, and other delivery mechanism aspects configured to properly prepare the particular substance. As a non-limiting example, for tea, a similar configuration of a beverage making substance delivery mechanism such as mechanism 88 as just explained but adapted as necessary or desired may be utilized. As another example, for ground coffee or tea, a more simple gravity feed hopper, or an auger system in connection with a container, or the like, may be provided. It is contemplated that the hopper 54 will have capacity to hold a sufficient quantity of beans or other beverage making substance for making numerous batches of beverage.

Bean grinder 58 and the other aspects of beverage making substance delivery mechanism 88 are automatically controlled in conjunction with operation of other aspects of the associated beverage making device 42, by a microprocessor based controller 68, which can comprise a single microprocessor or multiple ones networked, having at least one operator or user interface 70, here comprising a graphical touchpad, controller 68 being programmable to store and execute operating programs and routines for each of the beverage making devices 42, including to display desired graphics and input interfaces on user interface or interfaces 70. Alternatively, separate controllers 68 can be used. Controller 68 is connected to the controlled components of each beverage making device 42 by suitable conductive paths 72 which can be wires of a wiring harness, and/or a wired or wireless network, e.g., LAN, or the like. Controller 68 can include or be associated with other input/output devices, including wired and wireless network devices, Bluetooth devices, near field communication devices, and the like, for communicating with other systems, devices, and networks, in the well known manner.

The making of the beverage, here, brewing coffee or tea, requires a supply of a beverage making liquid medium, namely, hot water. As non-limiting examples of alternatives, for some beverages a liquid beverage concentrate or syrup may be used. For convenience, beverage maker 40 includes a source 74 of the beverage making liquid medium (hot water) contained in housing 66, comprising a hot water tank 76 of well-known conventional construction and operation, e.g., including a freshwater connection and valve for receiving water, a conventionally powered heating element, etc. Each beverage making device 42 includes a liquid medium delivery mechanism 78 operable to control delivery of the hot water from tank 76 to the respective device 42. Here, this includes a hot water pump 80 (either joint or one each for the devices 42) connected via a liquid medium delivery conduit 82, e.g., one or more hoses and/or tubes, between an outlet of pump 80 and the respective device 42 to serve as a liquid brewing medium delivery driver. Controller 68 controls flow of the liquid medium, e.g., hot water, via controlled operation of pump 80 and/or a hot water valve of mechanism 78 disposed in conduit 82, with flow being monitored and determined by a flow meter 84 connected to controller 68 which responsively controls the hot water delivery. As a convenience, conduit 82 additionally includes a connection to a hot water faucet 86 on the front of maker 40. Hot water tank 76 preferably has capacity for multiple batches of beverage, with a robust heating capability, so as to replenish hot water quickly when demand is high. This allows the tank 76 to be relatively small to conserve space, and allow room for larger decanters 46 or other beverage storage receivers for a given space. It also facilitates providing two beverage making devices in a relatively compact countertop package. As an alternative, connection to an external source of hot water can be used.

General method aspects of preferred autonomous operation under control of controller 68 according to the invention for brewing small, consistently high quality batches of coffee quickly, include directing a predetermined initial quantity of the liquid medium (hot water) into a beverage making or brewing chamber of the beverage making device, along with delivering all or a portion of a predetermined quantity of the beverage making substance or substances (e.g., ground coffee, tea) into the beverage making chamber, in a manner to quickly achieve full wetting of the beverage making substance by the liquid medium to make a concentrated quantity of liquid beverage extract.

At the same time, for some beverages, it is desired to commence degassing of the beverage making substance, that is, removing of carbon dioxide in the case of coffee. These important steps are preferably accomplished by mixing the beverage making substance in the beverage making liquid in a high state of agitation, as opposed to standing immersion of the beverage making substance in a large quantity of the beverage making liquid.

As or shortly after this limited, initial quantity of the hot water is introduced into the beverage making chamber, it is preferably commenced to be agitated by bubbling air through it, while mixing with the beverage making substance, without the beverage making substance settling significantly against a filter medium, as is observed to occur with many known conventional coffee brewers and French press type brewers. This is also preferably done in a non-pressurized or low pressure environment to allow the gas to escape. The agitation thus facilitates the penetration of the hot water into the ground coffee particles from virtually every direction to effect the desired extraction, in contrast to slow seeping with known brewers, and also the escape of gas from the particles.

As a preferred manner of agitation, the air (or gas) for generating the bubbling is introduced through a filter medium, comprising a liquid, air, and gas, but not ground coffee, permeable platform, separating a main beverage making or mixing region of the beverage making chamber from a drain or liquid collecting region. During the agitation, that portion of the drain conduit comprising a beverage delivery path or conduit to the receiving container, is preferably closed to prevent escape of the air used for agitation and reduce the quantity required.

According to further method aspects of the invention, once the concentrated initial beverage extract has been made, and the grounds largely degassed, the main beverage making or mixing region is closed, the bubbling air delivery through the filter medium is discontinued allowing the extract to be filtered and drained out of the beverage making chamber, and additional hot water introduced. This additional hot water can comprise all of the remaining quantity required to make the batch, or it can comprise one of 2 or more quantities that will provide the desired dilution, additional extraction, and overall quantity. The introduction of the additional hot water can be timed to occur at about the same time, just before, or after, the drain is opened, so that the additional water can act to force the extract from the beverage making material and through the filter.

The closure of the main beverage making or mixing region is advantageous in association with the introduction of the additional hot water, as this will serve to increase ambient pressure in the main beverage making or mixing region compared to pressure in the drain or liquid collecting region on the opposite side of the filter medium, to create a pressure differential therebetween which will function to push the initial extract and diluted extract through the filter medium into the drain region. Thus, advantageous pressurization can be achieved quickly without requiring pumping air into the mixing region, which can be time-consuming if a large quantity of beverage is being made. Providing a relatively small batch mixing region is advantageous in this regard, as it can be sufficiently pressurized very quickly merely by the introduction of the additional hot water, to enhance flow of the initial extract and dilute through the filter medium into the drain region. Presence of coffee grounds on the mixing region side of the filter medium will obstruct direct air flow therethrough and facilitate the creation of the pressure differential. Also, it will drive flow of the diluting hot water through the coffee grounds in that direction to extract and drain remnants of the initial extract and additional flavor components, all very quickly. Thus, it is evident that an adequate pressure differential for mixing and draining can be created without having to positively pressurize a large mixing or brewing vessel using an air pump or other means, and/or sealing and creating a partial vacuum condition in a large receiving container, and associated drain region of the mixing vessel. It should be noted, however, that it is an option to introduce pressurized air into the main mixing region during the second and subsequent dilutions to create a greater or enhanced pressure differential across the filter medium to press the dilute extract(s) through the filter medium, if desired or required for a particular beverage or quality. After a batch is complete, the remnant waste grounds are removed, and the mixing chamber can be optionally washed, in preparation for making a subsequent batch. As a result, small, high quality batches of beverage can be made in quick succession responsive to, or in anticipation of, level in the receiving container, demand, and/or other parameters, etc.

Figure 4:
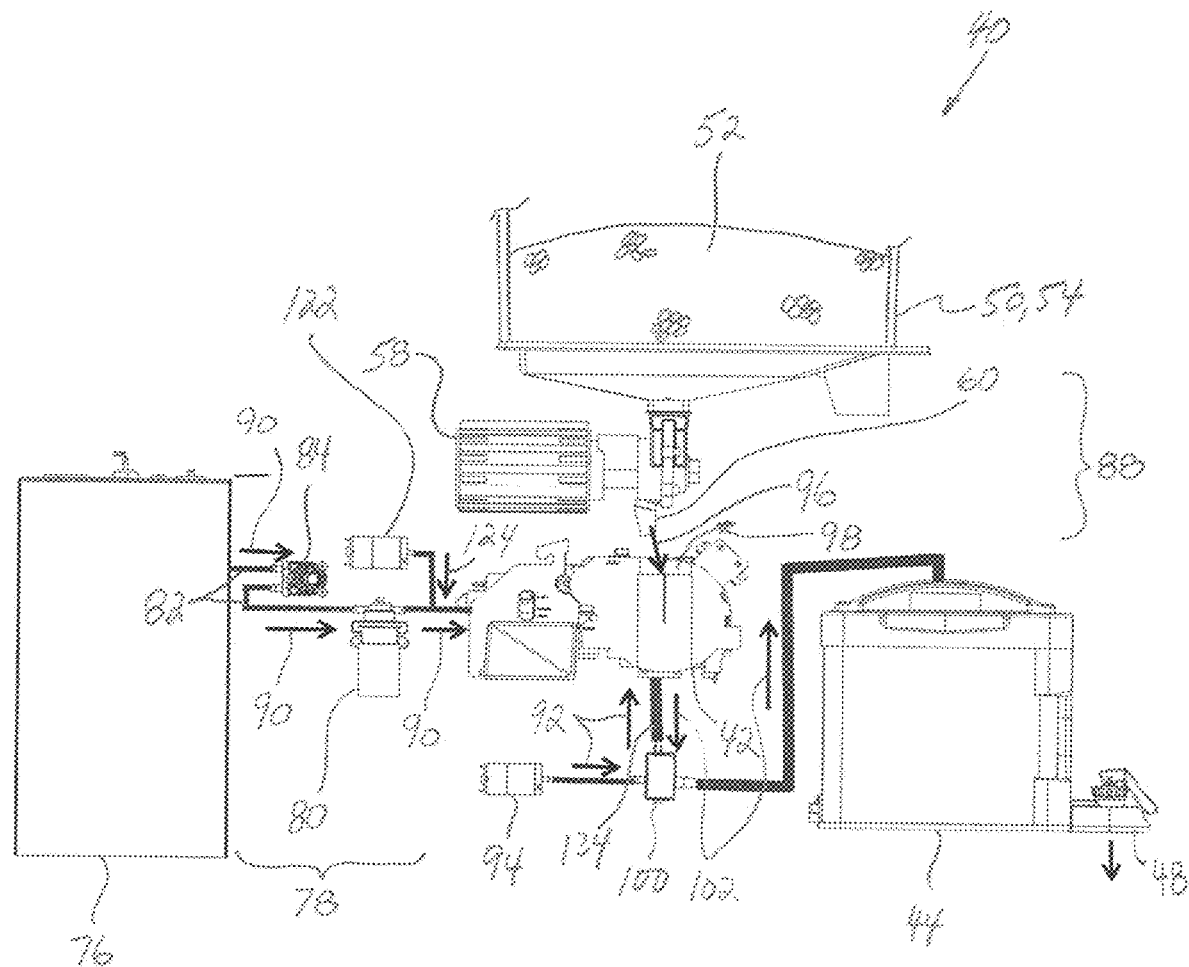
FIG. 4 is diagrammatic view depicting the various components involved in the functionality of a representative beverage making device of the beverage maker and the flow of liquid through the system from the hot water tank through the holding and dispensing tank accessible to the customer.

FIG. 4 is a general flow diagram illustrating the aforementioned steps of the method of the invention, executed by controller 68 using one of the beverage making devices 42 of the invention. As denoted by arrows 90, hot water pump 80 of liquid medium delivery mechanism 78 is operated by the controller to generate a flow of hot water through liquid medium delivery conduit 82 and flow meter 84, into a main beverage mixing region of a beverage making chamber of beverage making device 42, the amount of flow being determined with feedback from meter 84. This will be a limited initial quantity of hot water sufficient to effect extraction of a desired degree of flavoring elements, oils, very fine particles, from the beverage making substance, which here, for this example, will be ground coffee. At the same time, or shortly thereafter, a flow of air denoted by arrows 92, will be directed into a drain or collecting region of the beverage making chamber of the beverage mixing device 42. As will be explained, beverage making device 42 has a perforated filter medium configured as a platform within the beverage making chamber, separating the main beverage mixing region from the drain region. As the hot water reaches the filter medium, the air flow will percolate or bubble through it, creating desired agitation and turbulence. As mentioned above, it is advantageous to close a portion of the drain conduit extending to receiving container 44, so that the air flow is directed only into the drain or collecting region of the beverage making device 42. This is accomplished by a multiple port valve arrangement disposed in the drain conduit and controlled by controller 68, as will be explained. At about the same time, or shortly thereafter, controller 68 will operate bean grinder 58 to grind beans of beverage making substance 52, contained in hopper 54, to create a flow of ground coffee, denoted by arrows 96, which will enter the main beverage mixing region of the beverage making cavity by gravity through an opening provided for that purpose, as will be explained. Preferably, the quantity of ground coffee will be the entire quantity required for making the coffee batch. Within the main mixing region, the ground coffee and hot water will turbulently mix, completely wetting all of the grounds, so as to penetrate and release desired quantities of the flavoring elements and particles to thereby produce the concentrated initial beverage extract, and, as a byproduct, carbon dioxide and other gases. Because the main beverage mixing region is open, the gases readily escape, as denoted by arrows 98.

With the preparation of the concentrated initial beverage extract complete, the main beverage mixing region can be closed by the controller 68 and the air or gas flow through the drain conduit stopped, and the liquid medium delivery mechanism 78 operated by the controller to deliver an additional quantity of hot water to the main beverage mixing region as gauged by the flow meter 84. As explained above, because this region is now closed, the addition of this volume of liquid will pressurize air therein. And, because the initial extract and ground coffee is no longer being agitated, the ground coffee can settle against the filter medium. Multiple port valve arrangement 100 is controlled to open to allow flow through the drain conduit into the receiving container 44, as denoted by arrows 102. Receiving container 44 will be at ambient pressure. Thus, a higher pressure condition will exist in the main mixing region of device 42, and a lower pressure condition will exist in the receiving container 44, thereby creating a pressure differential across the filter medium, such that the additional hot water will mix with and press the initial extract through the coffee grounds and filter medium. As an optional feature, as noted above, additional air pressure can be generated in the main mixing region using an air pump to sustain and/or increase the pressure differential, to facilitate flow of the beverage into the receiving container 44. This can optionally be delivered through aspects of the liquid medium delivery mechanism as denoted by arrow 124, by connection of an air pump 122 in conjunction therewith, as will be explained, or separately. The step of addition of hot water as a diluting medium as well as for further flavor extraction, and supplying air into the main mixing region to enhance flow, can be performed one or more times as desired or required for completing a particular beverage batch.

It should be recognized and understood that the steps of the preferred method of the invention can be performed using a variety of different beverage making apparatus, although devices, 42 of beverage maker 40 are exemplary and preferred.

Figure 4A:
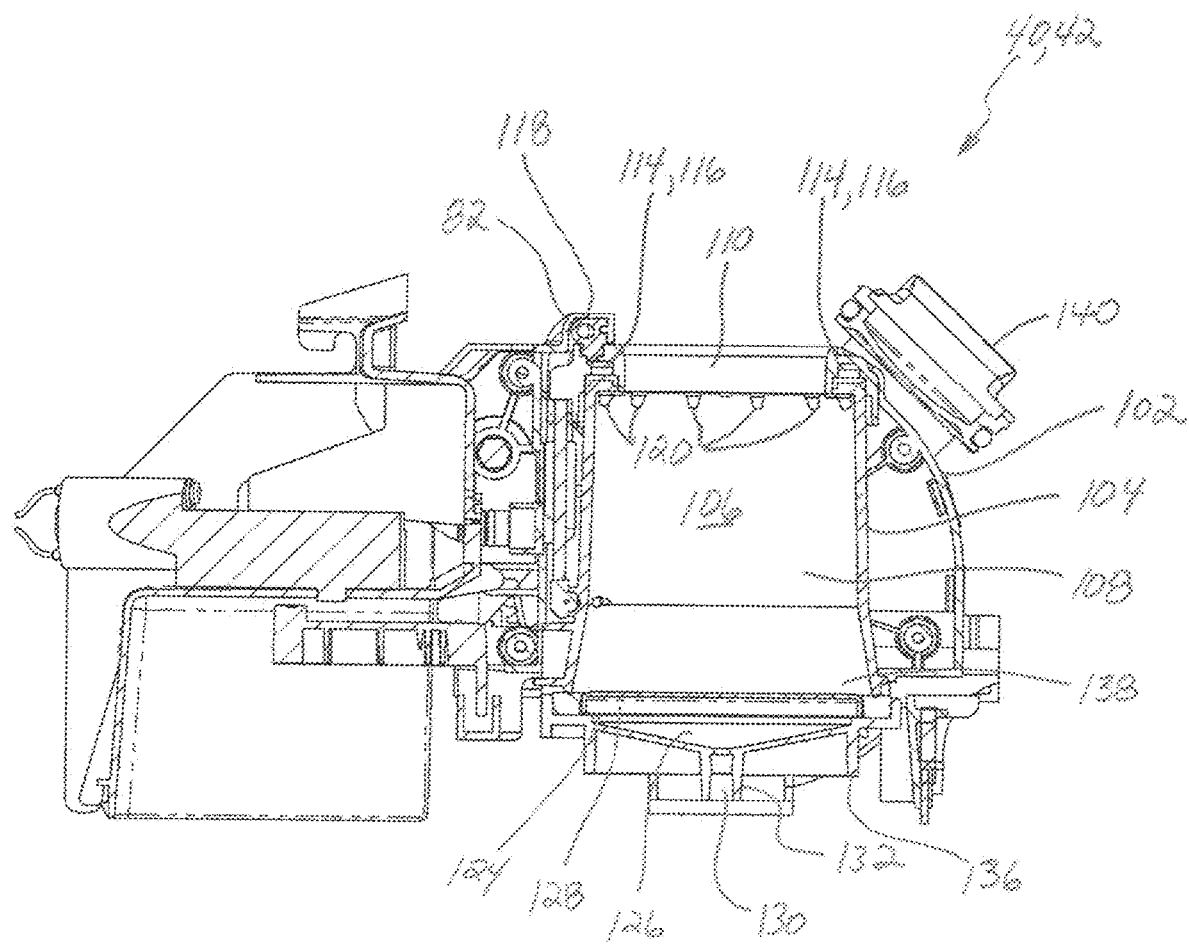
FIG. 4A is a sectional view of one of the beverage making device and attached motor drive system showing internal aspects thereof, namely, a beverage making or brewing chamber, with an upper closure member in a normal home or starting position, which is open, and a lower closure member closed.
Figure 9:
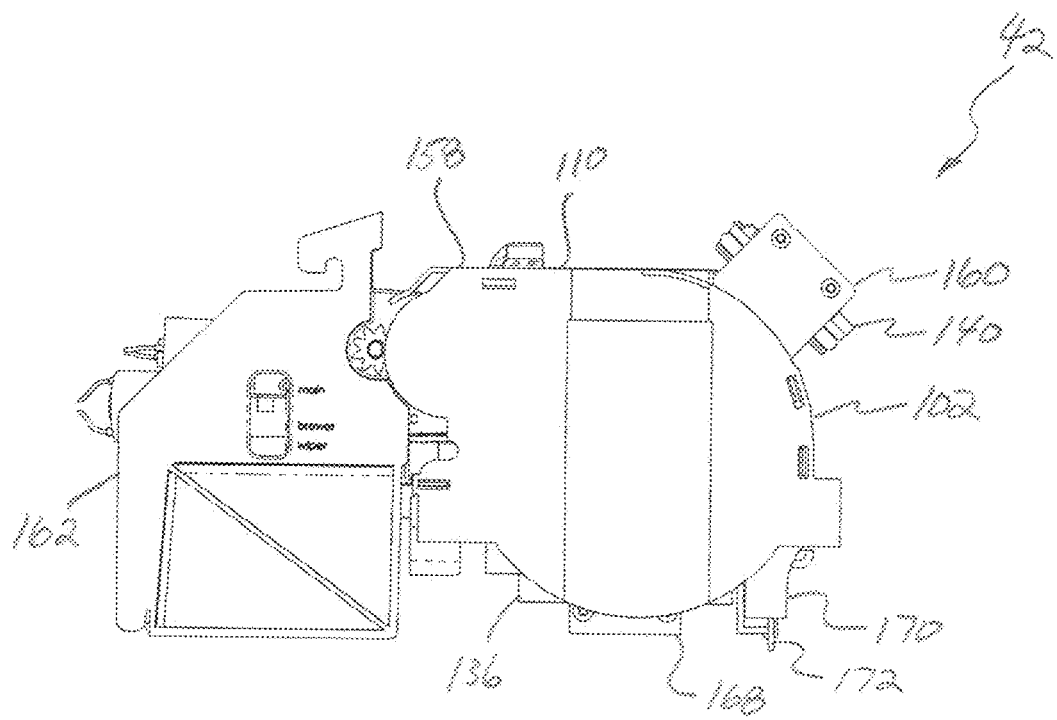
FIG. 9 is a side view of a representative beverage making device and attached motor drive system which is constructed to brew coffee or tea, and dispose of the depleted grounds or leaves into a waste container after brewing.
Figure 10:
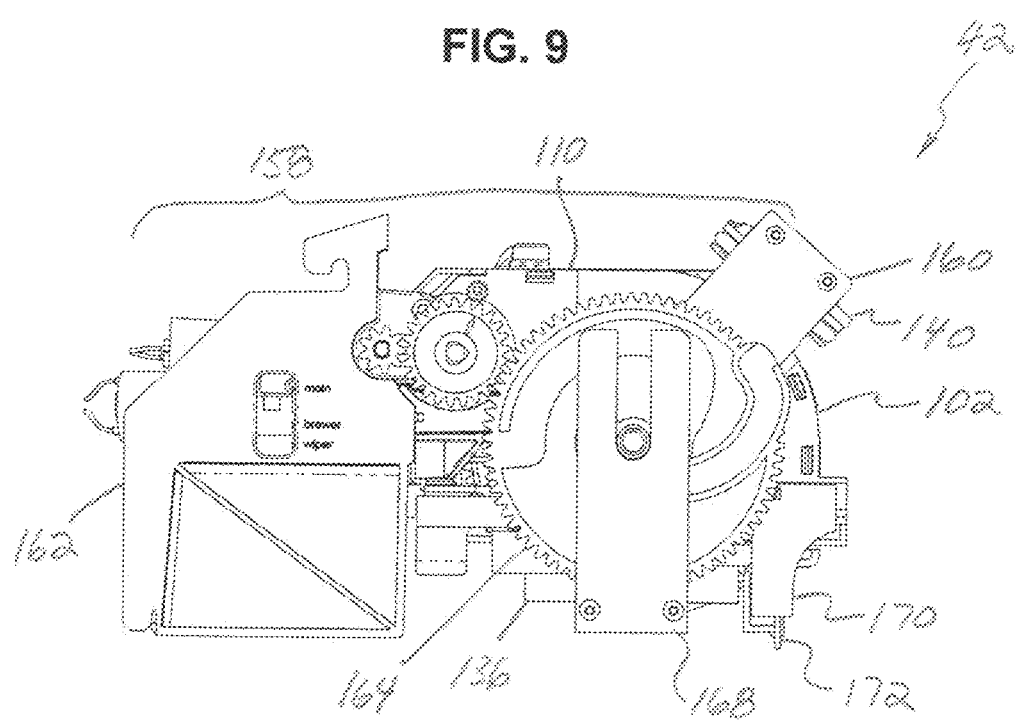
FIG. 10 is a side view of the representative beverage making device of the invention and attached rotary cam driver system with side cover removed to show an internal cam track gear train. The beverage making device as depicted is in the normal home or starting position ready to accept ground coffee or tea leaves. Hot water can be introduced internally during this cycle and the valve arrangement shown in FIGS. 6-8 can be energized to introduce pressurized air from below to agitate the hot water.
Figure 11:
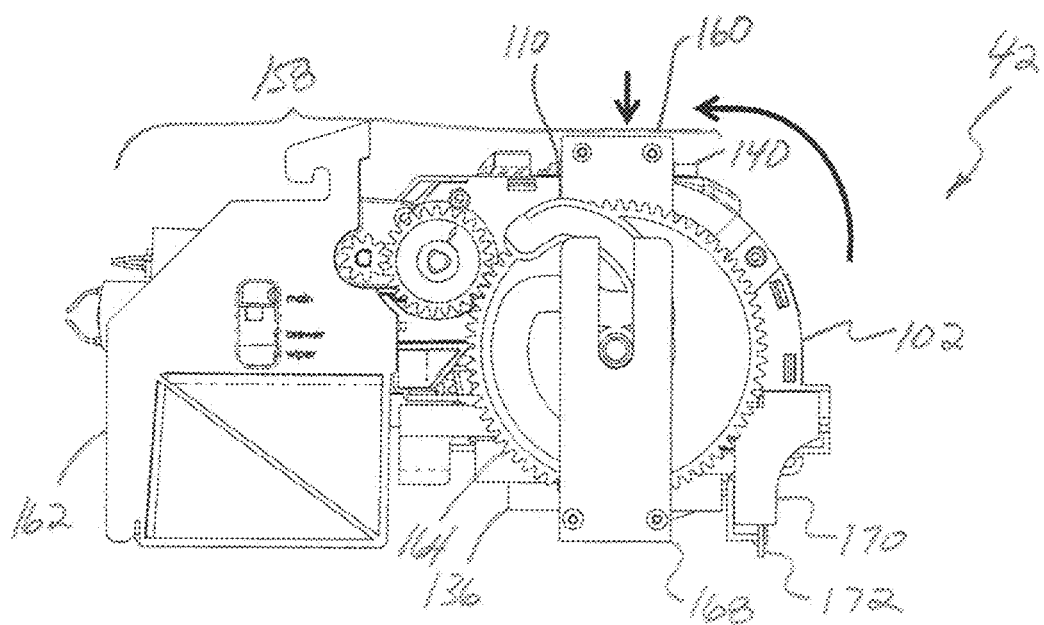
FIG. 11 is a side view of the beverage making device and attached rotary cam driver system of FIG. 10 with the side cover removed to show the internal cam track gear train position after the ground coffee or tea have been introduced and agitated by the air introduced by the valve arrangement shown in FIGS. 6-8. The beverage making device as depicted is in the closed position, wherein additional air is introduced from the water/air inlet to force liquid out through a drain conduit and into the holding/dispensing container.
Figure 16:
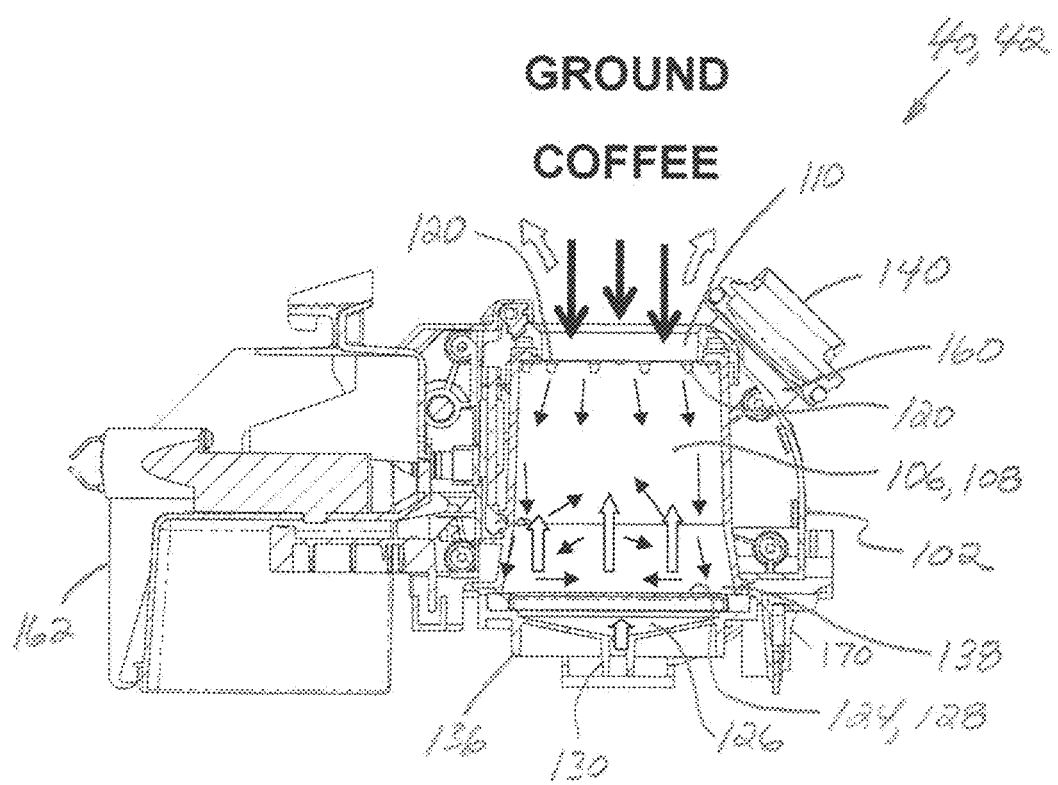
FIG. 16 is a sectional view of the beverage making device and attached rotary cam driver system showing the components of the beverage making or brewing chamber in the normal home or starting position depicting the flow of coffee grounds of tea leaves when a brew cycle is initiated. The solid media is introduced through an upper opening into the beverage making or brewing chamber with a liquid dispensing ring about the upper opening dispensing hot liquid peripherally into the chamber and onto a filter platform through which air is passing upwardly to bubble through the hot liquid, the solid media being thus turbulently agitated to release extract and gas from the solid media.
Figure 16A:
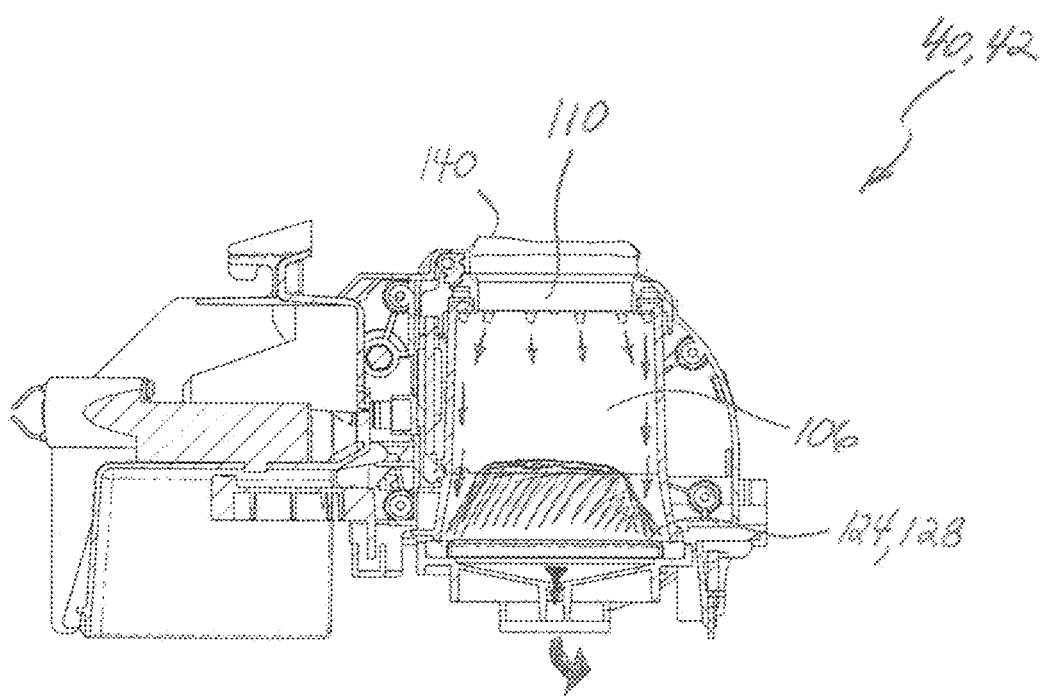
FIG. 16A is another sectional view of the beverage making device shown in the closed position depicting the flow of hot water from the dispensing ring into the beverage making or brewing chamber to dilute the extract and force it through the filter platform, wash the grounds or leaves from the sidewall and contain them on the filter platform ready for disposal. Thereafter, pressurized air is introduced in the same manner through the dispensing ring to continue pressurization to force the dilute through the filter platform toward the drain region and dry the remaining residual grounds or leaves.

Referring also to FIG. 4A, it shows internal aspects of preferred beverage making device 42. A housing 102 having a sidewall 104, conveniently of cylindrical shape, and manufactured from a suitable material, such as injection molded plastics, bounds a beverage making chamber 106, also referred to sometimes as a brewing chamber. Beverage making chamber 106 has a main beverage making region 108, in which the beverage will be made, here, "brewed" in the context of coffee, tea, and other brewed beverages. Housing 102 has a beverage making substance delivery opening 110 at one end of the cylindrical shape, through which a beverage making substance or substances, e.g., coffee grounds or fragmented tea leaves, are delivered into chamber 106. Referring also to FIGS. 17, 17A, and 18, housing 102 carries a segment of liquid medium delivery conduit 82 comprises a liquid medium delivery nipple 112 that connects to the tubing and or a hose of conduit 82 extending from hot water pump 80 (see FIG. 4), to receive the flow of hot water therefrom. Liquid medium delivery nipple 112 connects to an internal annular passage 114 within a liquid delivery spray ring 116, also sometimes referred to herein as a spray dome or dispensing ring, carried on housing 102 about beverage making delivery opening 110 and secured in position by a support ring 118 of housing 102 that defines opening 110. Spray ring 116, in turn, has an annular arrangement of openings 120, preferably configured as spray nozzles, at spaced locations about opening 110, in fluid connection with annular passage 114, and angled toward the inner surface of sidewall 104. Accordingly, as depicted in FIGS. 16 and 16A, when the liquid beverage making medium (hot water) is being delivered by the liquid medium delivery mechanism 78 in the above described manner, the hot water will flow through conduit 82 and nipple 112 into annular passage 114, wherein it will be distributed to openings 120, so as to be sprayed into beverage making chamber 106, mainly against sidewall 104, as depicted by small black arrows.

Referring again to FIG. 4, as also discussed above, an optional air pump 122 is connected to conduit 82, and controllably operable by controller 68 to deliver a flow of air through spray ring 116 and openings 120, into main beverage making region 108, for facilitating flow of the beverage to the receiving container, and other purposes. This is also represented by the small black arrows in FIG. 16A.

A filter platform 124 or tray is supported in beverage making chamber 106, separating main beverage making region 108 from a collecting or drain region 126. Filter platform 124 comprises a filter medium 128. A filter medium 128 of known construction and operation, e.g., fine mesh or screen, that is permeable to the liquid medium (here, hot water), air, and gas, but largely impermeable to elements of the beverage making substance or substances, particularly, remnants of the beverage making substance or substances (here, ground coffee). A drain outlet 130, comprising a drain nipple 132, connects to a drain conduit 134 (also see FIG. 4) that extends to an inlet of receiving container 44. Filter platform 124, drain region 126, outlet 130 and drain nipple 132, are carried on a lower closure member 136 shown supported in a closed position in closing relation to a lower opening 138 defined by sidewall 104 of housing 102. An upper closure member 140 is shown supported in an open position beside beverage making delivery opening 110. Lower closure member 136 is movable under control of controller 68 between a closed state in the closed position shown and an open state, which is an open position separated from lower opening 138 to allow removal of residual beverage making substance remaining from the beverage making process, as will be explained. Upper closure member 140 is movable under control of controller 68 between an open state, which is the open position, and a closed state, which is the closed position closing opening 110, as will also be explained.

Again referring to FIG. 4, it can be observed that the overall size of housing 102, and thus beverage making chamber 106 of device 42, is only a fraction of the overall size of receiving container 44 which is a multiple serving capacity decanter, which fractional size can be varied for different applications and desired small beverage batch sizes. As a non-limiting, general rule, receiving container 44 will have a volume equal to several multiples of the volume of the associated beverage making device 42. It should also be apparent that, given the small size of beverage making chamber 106, the required relatively small quantities of beverage making substance or substances and liquid medium can be prepared and delivered quickly, and the finished batch drained quickly, so that a succession of high quality small batches can be prepared over the course of a relatively small period of time, corresponding to anticipated beverage demand.

FIGS. 5, 6, 7, and 8 show various aspects of one embodiment of a multiple port valve arrangement 100 constructed and operable according to the teachings of the invention, comprising a brewed beverage dispensing valve for the device 42. Valve arrangement 100 includes a main hollow body 142 having a port 144 that connects with drain nipple 132 of drain outlet 130 of beverage making device 42 (see FIG. 4A) via suitable hose or tube, comprising a segment of drain conduit 134. Hollow body 142, has a port 146 that will connect to a portion of drain conduit 134 extending to an inlet of the associated receiving container 44. Body 142 further includes a port 148 that connects with air pump 94 (see FIG. 4). Body 142 includes a diaphragm 150 having a central orifice 152 therethrough, and a compression spring 154 disposed about a valve seat 156, which in turn extends about an internal portion of port 146. In a first operating state with no air flow from air pump 94 into port 148, spring 154 will hold diaphragm 150 away from valve seat 156 to allow flow of beverage through main body 142 from port 144 to port 146, as denoted by the arrows in FIG. 7, which corresponds to arrows 102 in FIG. 4. In a second operating state with air pump 94 operated by the controller to produce a pressurized air flow into port 148, the air within body 142 will act to force diaphragm 150 against the valve seat 156, to prevent the beverage flow to the receiving container. Due to the presence of orifice 152, which aligns with the valve seat 156, with the diaphragm in this position, some of the pressurized air flow will pass into port 144, so as to flow through the drain conduit 134 and drain outlet 130 into drain region 126 of the beverage making device 42 (see arrows 92 in FIG. 4) for bubbling through filter medium 128 in the above described manner. Here it should be understood that valve arrangement 100 shown and described here is a non-limiting representative valve arrangement, and that the valve arrangement in FIG. 4 is meant to depict other configurations, such as, but not limited to, a solenoid or servo controlled multiple port valve, or separate valves for air and liquid flow control, controllably operable by controller 68 to provide the described operating capabilities.

Referring also to FIGS. 9-16A, operation of a mechanical cam track gear train 158 of a representative beverage making device 42, for transitioning beverage making delivery opening 110 between an open state for delivery of beverage making material, and escape of gases from beverage making chamber 106 (FIG. 16); and a closed state to allow pressurization of beverage making chamber 106 FIG. 16A); and transitioning lower opening 138 between its closed state and open state for removal of remnant waste beverage making substance (depleted coffee grounds, tea leaves, etc.), is explained.

Figure 12:
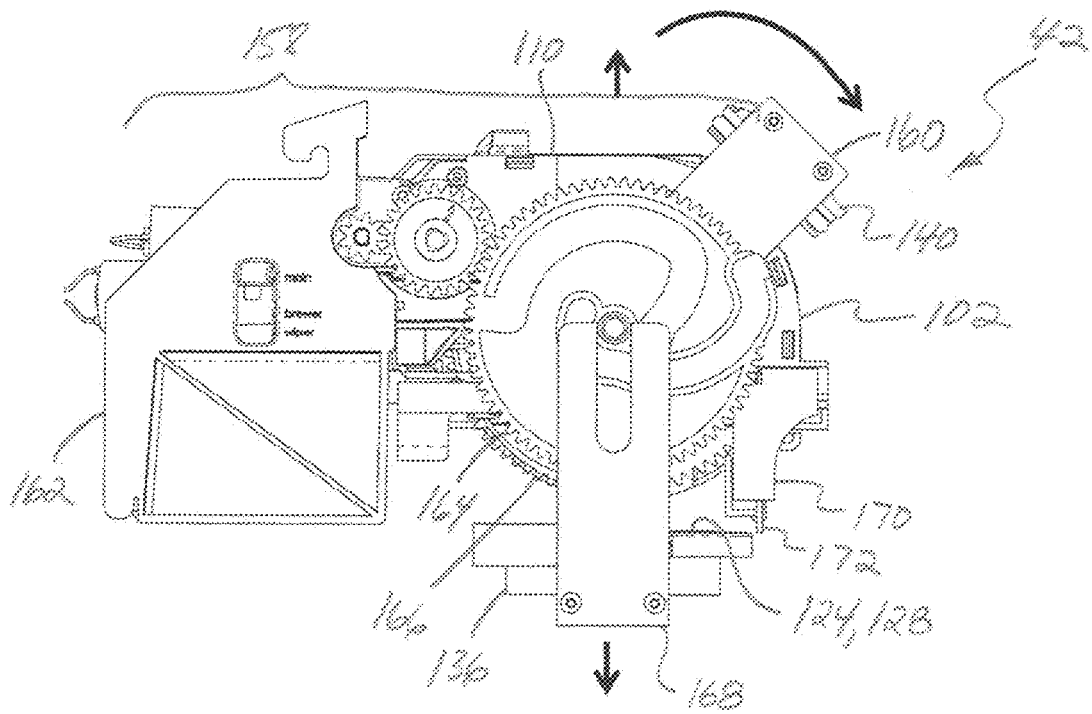
FIG. 12 is a side view of the beverage making device and attached rotary cam driver with the side cover removed to show the internal cam track gear train position after the ground coffee or tea have been brewed and the liquid beverage has been forced out of the beverage making or brewing chamber. The beverage solid residue that remains after the brewing chamber has been cleared of water is optionally dried by additional air flow from above. The filter platform is lowered by the rotary cam driver system and in position to be removed by the wiper attached to the sliding wiper support arm.
Figure 13:
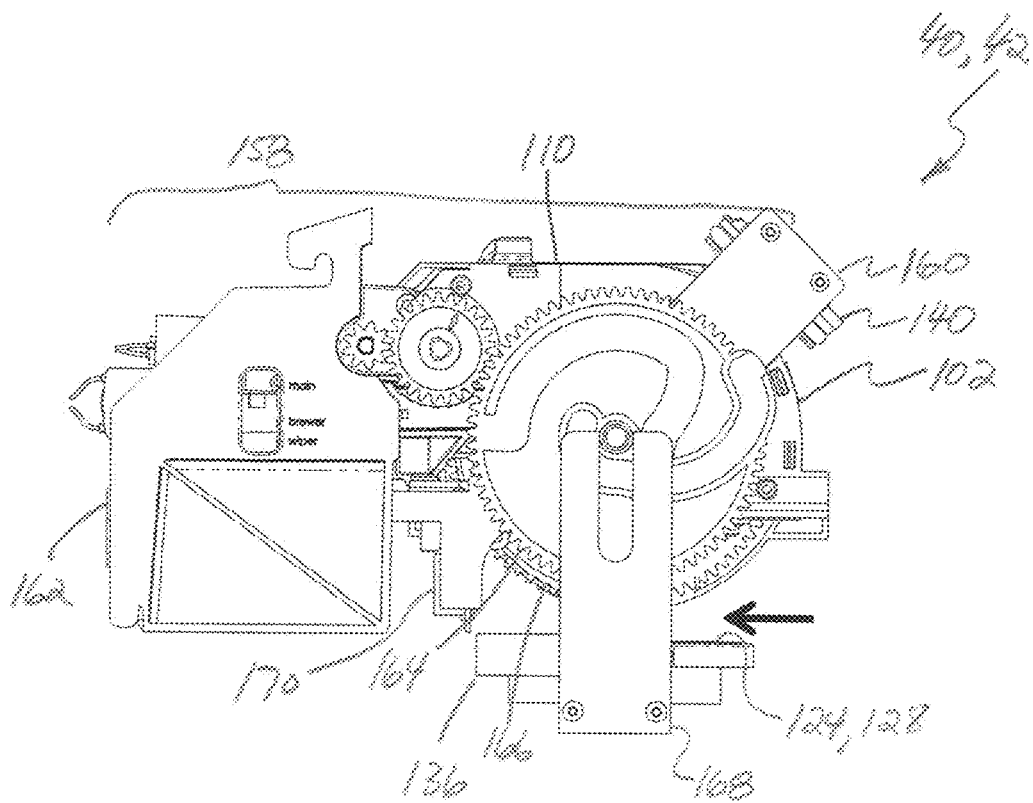
FIG. 13 is a side view of the beverage making device and attached rotary cam driver with the side cover removed to show the wiper blade after being driven across the filter platform to push the residual coffee/tea into a waste container.
Figure 14:
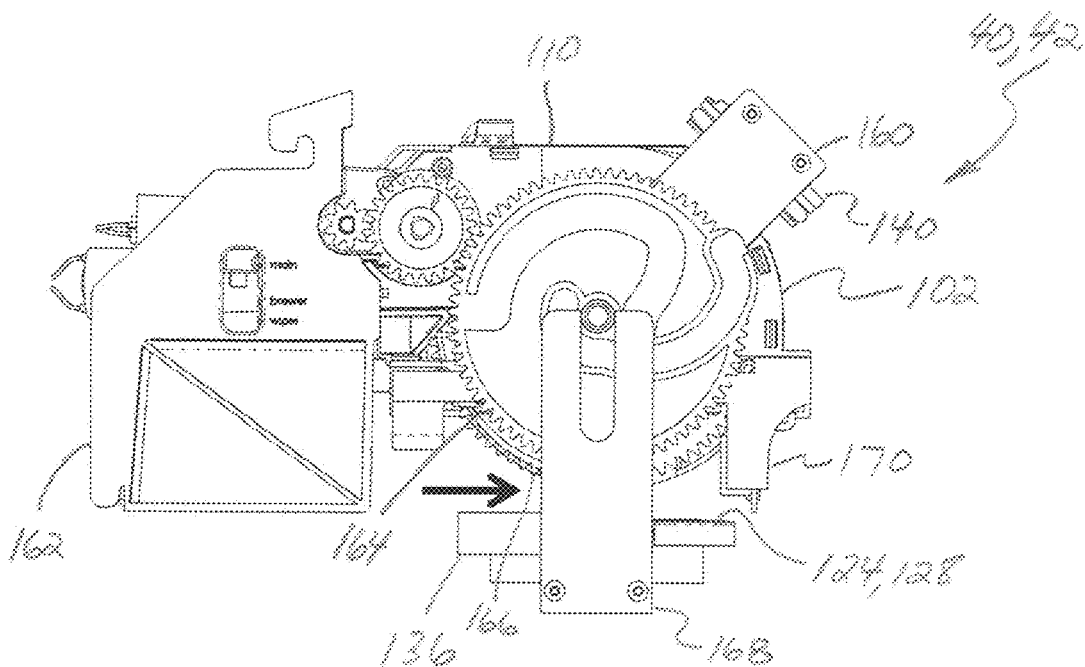
FIG. 14 is a side view of the beverage making device and attached rotary cam driver system with the side cover removed to show the wiper after return across the filter platform to its normal position.
Figure 15:
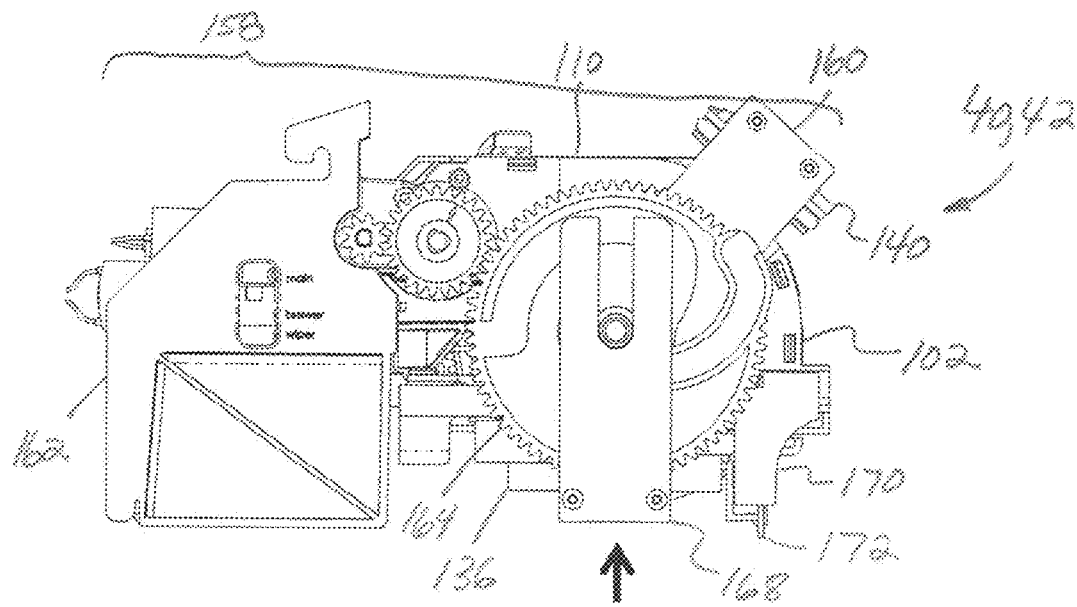
FIG. 15 is a side view of the beverage making device and attached rotary cam driver system with the side cover removed to show the components of the beverage making or brewing chamber returned to the normal home or starting position ready to accept ground coffee or tea leaves as also depicted in FIG. 10.

Essentially, cam track gear train 158 utilizes a rotary cam driver assembly 162 controllably operable in one mode by controller 68 to rotate a cam track gear 166 in connection with an upper support arm 160 supporting upper closure member 140, to counterclockwise rotate and lower upper closure member 140 (as denoted by arrows in FIG. 12) from a position spaced from the beverage making delivery opening 110 (opening 110 in its open state), to a position in closing relation to opening 110 (its closed state). As shown in FIG. 12, rotary cam driver assembly 162 is controllably operable to lift and rotate upper closure member 140 clockwise from the position in closing relation to opening 110, to the open position—the open state of opening 110.

The rotary cam driver assembly is controllably operable in another mode by controller 68 to rotate a cam track gear 164 to move a lower support arm 168 having a follower or followers engaged with cam tracks of gear 164, and carrying lower closure member 136, for moving lower closure member 136 between a position in closing relation to lower opening 138 so that opening 138 is in its closed state, as shown in FIGS. 9, 10, 11, 15, and 16 and a lowered position spaced below that opening 138, as shown in FIGS. 12 (lower arrow), 13, and 14. In the lowered position, it can be observed that a space exists between filter platform 124 and housing 102, with filter medium 128 facing upwardly toward the space. A wiper support arm 170 carrying a wiper 172 of a suitable material, such as a rubber material, is movable by a linear waste disposal driver of rotary cam driver assembly 162 as controlled by controller 68, e.g., a screw, scroll or other linear drive connection, back and forth across filter medium 128 of filter platform 124, as denoted by large arrows in FIGS. 13 and 14, to wipe any remnant waste beverage making substance therefrom and into an accompanying waste receptacle (not shown) that will be located below device 42.

As previously explained, FIG. 16 illustrates upper closure member 140 in its open position to admit a quantity of the beverage making substance (ground coffee, tea leaves), as denoted by large black arrows. Liquid beverage making media (hot water, depicted by small black arrows) is dispensed from openings 120, peripherally about chamber 106 into the main beverage making region 108, so as to flow over filter platform 124 from the sides. Air, as denoted by large white arrows, enters through drain outlet 130 and passes through filter medium 128 of platform 124 to bubble upwardly through the liquid medium, generating turbulence, and into which the beverage making substance falls and mixes, the mixture being agitated to release concentrated extract from the beverage making substance as well as gases, e.g., carbon dioxide, which, with the air, will escape through opening 110, as denoted by the large white arrows in that region. During this step, the drain is closed to prevent flow to the receiving container (not shown).

In FIG. 16A, after the making of the concentrated initial extract, the drain is opened and up flow of air discontinued, and upper closure member 140 is moved to closing relation to opening 110 in the above described manner, so that it is now in its closed state. Hot water, depicted by the small black arrows, is dispensed peripherally into chamber 106 to dilute the concentrated initial extract and force the diluted beverage mixture through the filter medium 128 of filter platform 124, into the drain region en route to the receiving container. This hot water flow can also act to wash beverage making material from the sidewall of the chamber. This step can be performed one or more times as desired or required for making a particular beverage batch. At any time during this step, once the desired quantity of liquid beverage making medium has been delivered, air pump 94 (FIG. 4) can be activated by the controller to introduce air into chamber 106 through the spray ring (also denoted by the small black arrows) to further pressurize chamber 106 above the filter platform to force remaining liquid therethrough, and at the end of the step, dry the residue in preparation for disposal.

Figure 19:
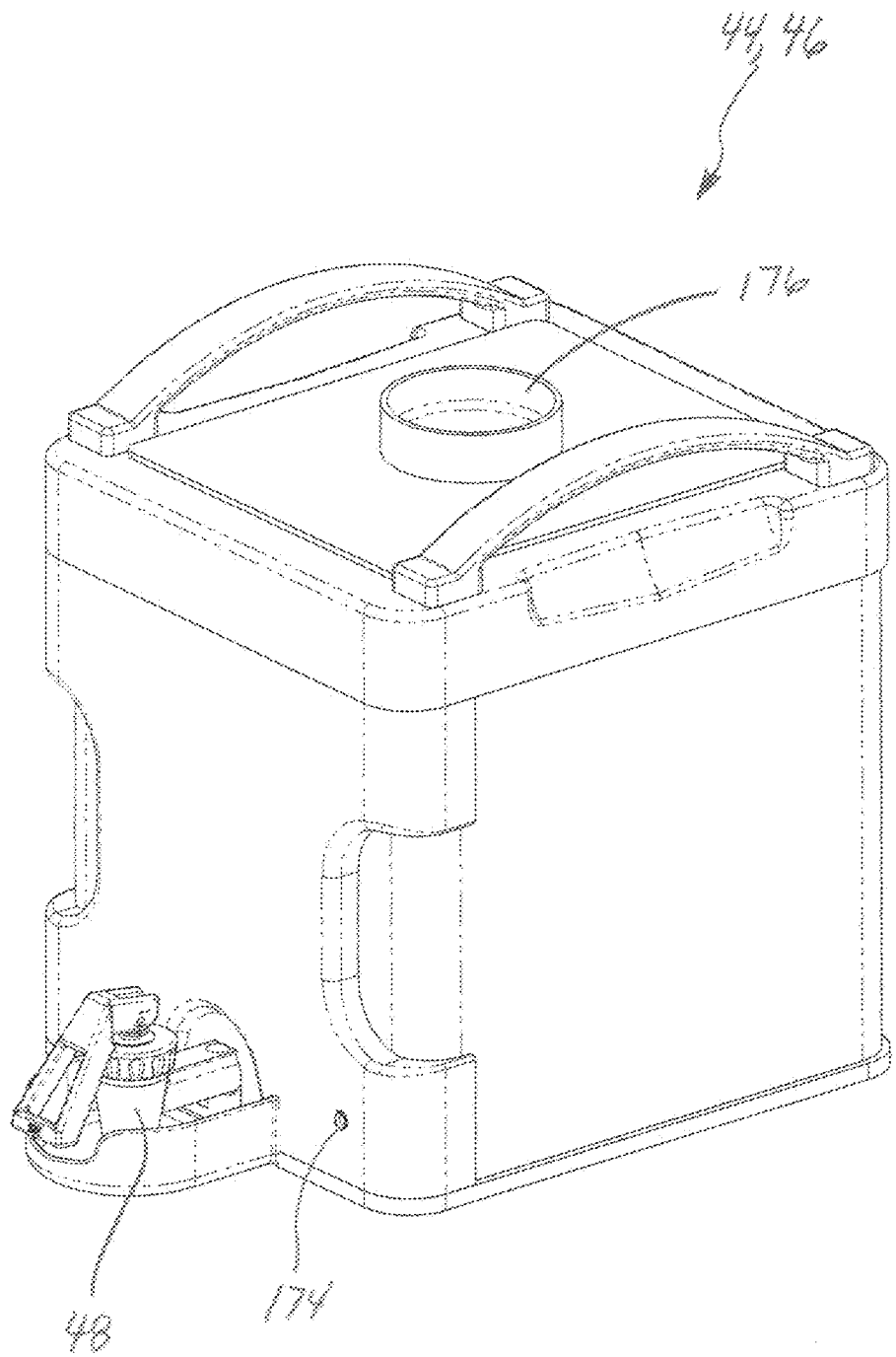
FIG. 19 is an isometric view of a representative beverage holding and dispensing container showing aspects including a freshness indicator light and liquid dispensing faucet.

FIG. 19 is an isometric view of a representative beverage storage and dispensing container 44 for use either of the beverage making devices 42 of with beverage maker 40, which is a serving decanter 46, having the dispensing faucet 48 manually operable to dispense beverages in desired quantities. A freshness indicator 174, which can be, for instance, a small light, is shown on the front, and will be connected to controller 68 (FIG. 1) in a suitable manner, e.g., by Bluetooth or near field communications, via a communications interface 190 (FIG. 20) and energized to indicate a particular condition, for instance, age or freshness of the contents. Decanter 46 includes an inlet opening 176 through which a beverage from the drain conduit of an associated beverage making device will flow into the interior of the decanter.

Figure 20:
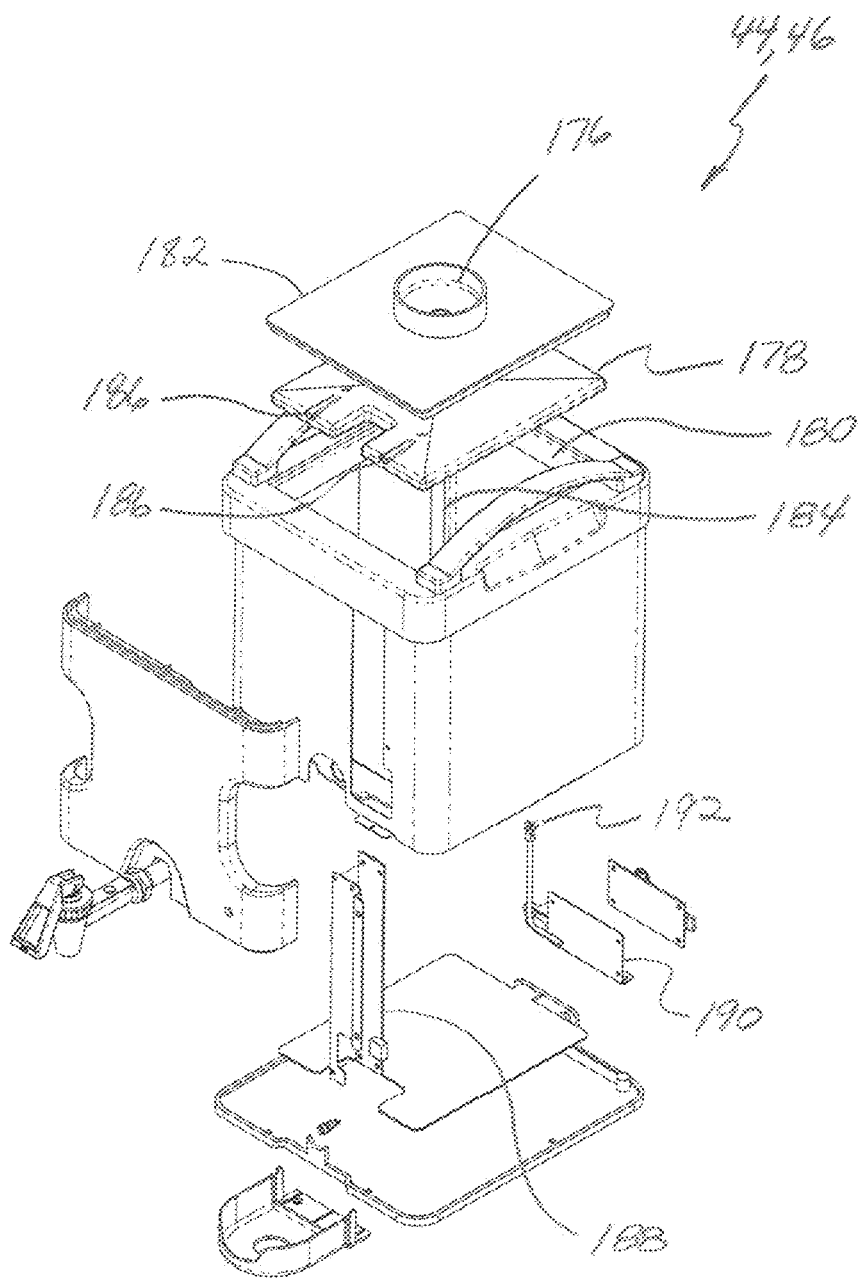
FIG. 20 is an isometric exploded view of the beverage holding and dispensing container as depicted in FIG. 19, depicting aspects thereof including a removable cover, liquid level/freshness float, liquid fill tube, liquid holding tank, heater thermostat, heater control circuit board, liquid level detection system, cover and support brackets and dispensing handle.

FIG. 20 is an exploded view of a representative receiving container 44, configured as a serving decanter 46, showing internal aspects. In particular, decanter 46, comprises a floating platform 178 designed to float on the beverage contained in the decanter, and having a sectional shape when viewed from above, generally conforming to, but smaller than, an internal cavity 180 of the decanter located below a cover 182. A fill tube 184 is attached to cover 182, in association with inlet opening 176, and extends through a hole in floating platform 178 to a bottom region of cavity 180, for delivering fresh beverage to that region. Floating platform 178 has an overall shape and size when viewed from above matching that of the internal cavity 180, but smaller and serves as an insulation aid to limit the heat and flavor loss by covering a majority of the top surface of the beverage contained in cavity 180. Floating platform 178 is also constructed to house magnetic or metallic rods or inserts 186, the presence and location of which are detectable by an upstanding sensor strip 188 disposed at a proximate location on the outer surface of decanter 46. Strip 188 preferably including a series or array of magnetic sensors, e.g., Hall effect sensors, reed switches, or the like, controllably operable in the well known conventional manner for sensing proximity of an item. Sensor strip 188 is connected to communications interface 190, e.g., Bluetooth, near field communications interface, for communicating with controller 68 (FIG. 1). Essentially, in operation, as the height of floating platform 178 varies, the sensor or sensors of strip 188 at or corresponding to the height will detect the presence of the associated insert 186 to sense the level of the beverage in cavity 180, which will be communicated to the controller 68. In this regard, it should be recognized and understood that other suitable sensing apparatus and systems can be incorporated with a decanter to communicate with controller 68, including, but not limited to, a mass or weight sensing device, such as a pressure pad, or the like, operable to sense the overall weight of the decanter and thus changes, and rates of change, in the weight of the decanter; or an optical, radio, or ultrasonic proximity sensing device, disposed at the same or another location, such as in the top of cavity 180.

Optionally, a temperature sensor 192, e.g., a thermocouple, at an appropriate location on decanter 46 can be connected to communications interface 190, to provide information representative of temperature of the beverage contents to controller 68. An associated heating element can also optionally be provided and activated, either by a signal from a sensor 192 in a feedback loop, or by controller 68, to heat the beverage contents of decanter 46.

In operation, information from sensor strip 188 or another sensing system, can be used by controller 68 to determine when to initiate making of a new beverage batch or batches. As non-limiting examples, the making of a new batch or batches can be initiated responsive to beverage level, e.g., falling below a certain programmed set point; and/or responsive to a rate of change (e.g., downward movement) of platform 178, thus representing a dispensing rate of beverage, determined by controller 68 from signal changes from the sensor strip 188 or other sensor system. Under high beverage dispensing volume conditions, e.g., busy times in a restaurant, café or the like, while the associated beverage making device is replenishing the beverage, movements of floating platform 178 may at times be alternatingly upward and downward, and controller 68 can be programmed to responsively determine whether to continue making additional batches, corresponding to set rules and/or adaptively based on history. As the batches are of small volume compared to the volume of decanter 46, even small changes in dispensing volume can be responded to for closely maintaining a desired level of beverage. Decanter time on station can also be monitored to determine freshness, and a signal outputted by controller 68 to personnel indicating that a decanter should be emptied, cleaned, etc.

Figure 21:
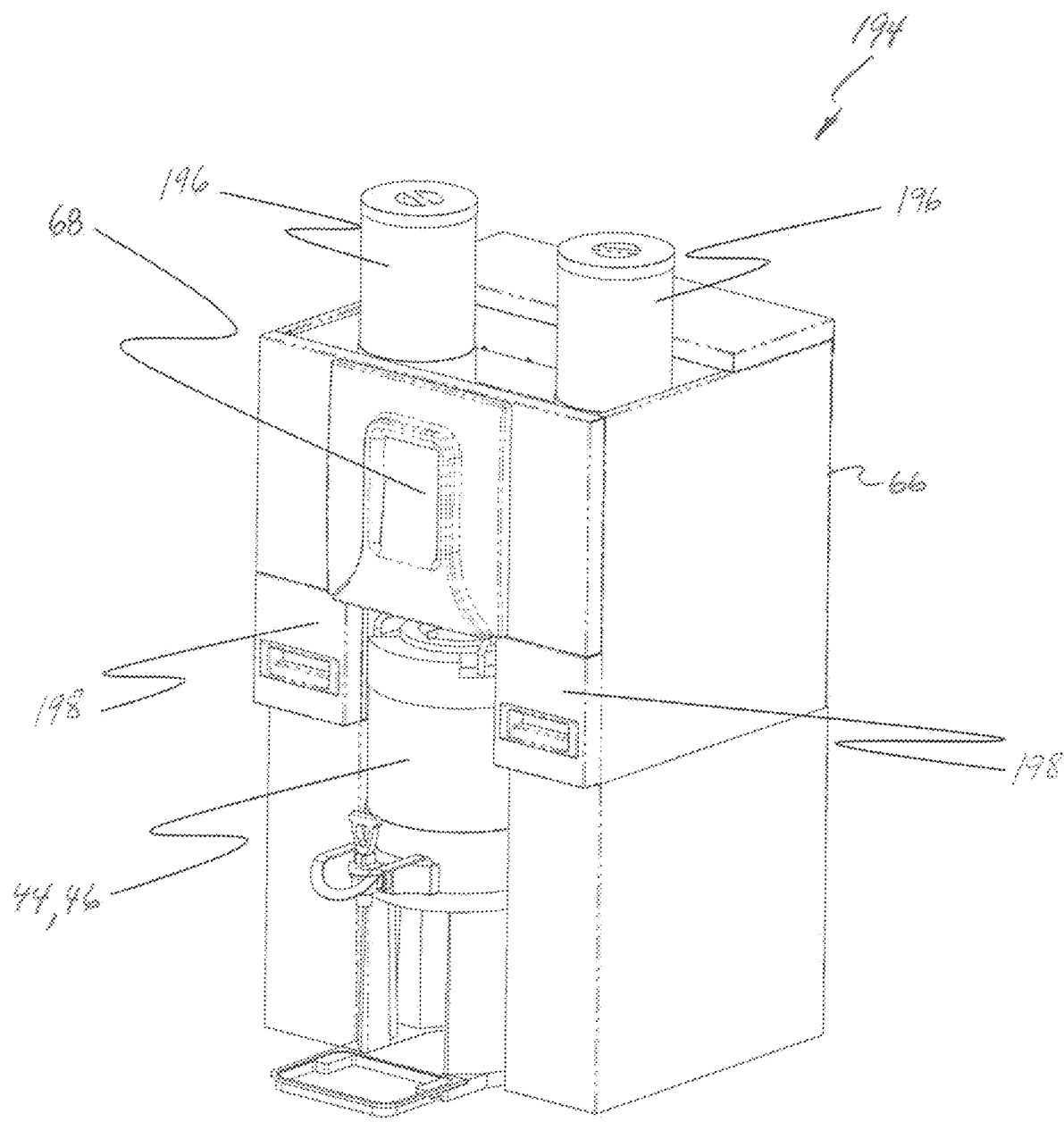
FIG. 21 is another embodiment of the beverage maker of the invention configured to brew pre-ground coffee or cut or loose leaf tea beverages into a single container using removable trays for waste. This embodiment does not require a bean grinder.

FIG. 21 depicts an alternate construction of a beverage maker 194 constructed and operable according to the invention, like parts of beverage maker 194 and beverage maker 40 being identified by like numerals. Mainly, in beverage maker 194 pre-ground coffee or tea, or other beverage making substance, is stored in dispensing canisters 196 disposed on housing 66 above associated beverage making devices (reference beverage making devices 42 described herein above) constructed and controllably operable by controller 68 in the above described manner, with the exception that there is no grinding of beans or tea leaves. Beverage maker 194 includes a central receiving container 44, which again is a serving decanter 46 for dispensing individual servings, which receives beverage from the respective beverage making devices. Waste drawers 198 are removably incorporated into housing 66 below the beverage making devices for receiving depleted grounds or leaves wiped from a filter platform or tray in the above-described manner in relation to beverage making devices 42. Decanter 46 for this embodiment is contemplated to be easily removable from housing 66, and placed at other locations for dispensing the beverage, and associated additional decanters 46 can be inserted into the housing to be refilled, essentially enabling and facilitating efficient shuttling of full and empty decanters between the beverage maker and the other location. For this purpose, the decanters can include the sensing apparatus and systems described above in relation to FIG. 21, so that the level, dispensing rate, beverage age, and other information, can be communicated from the decanters to controller 68 for responsive action. Further in this regard, controller 68 and/or interface 190 can be configured to broadcast signals to other communication devices, such as, but not limited to, mobile phones, computers, point-of-sale registers, and the like, to notify a responsible person or persons that a particular decanter requires service, such as replacement and refilling, cleaning, battery replacement or charging, location, etc.

Figure 22:
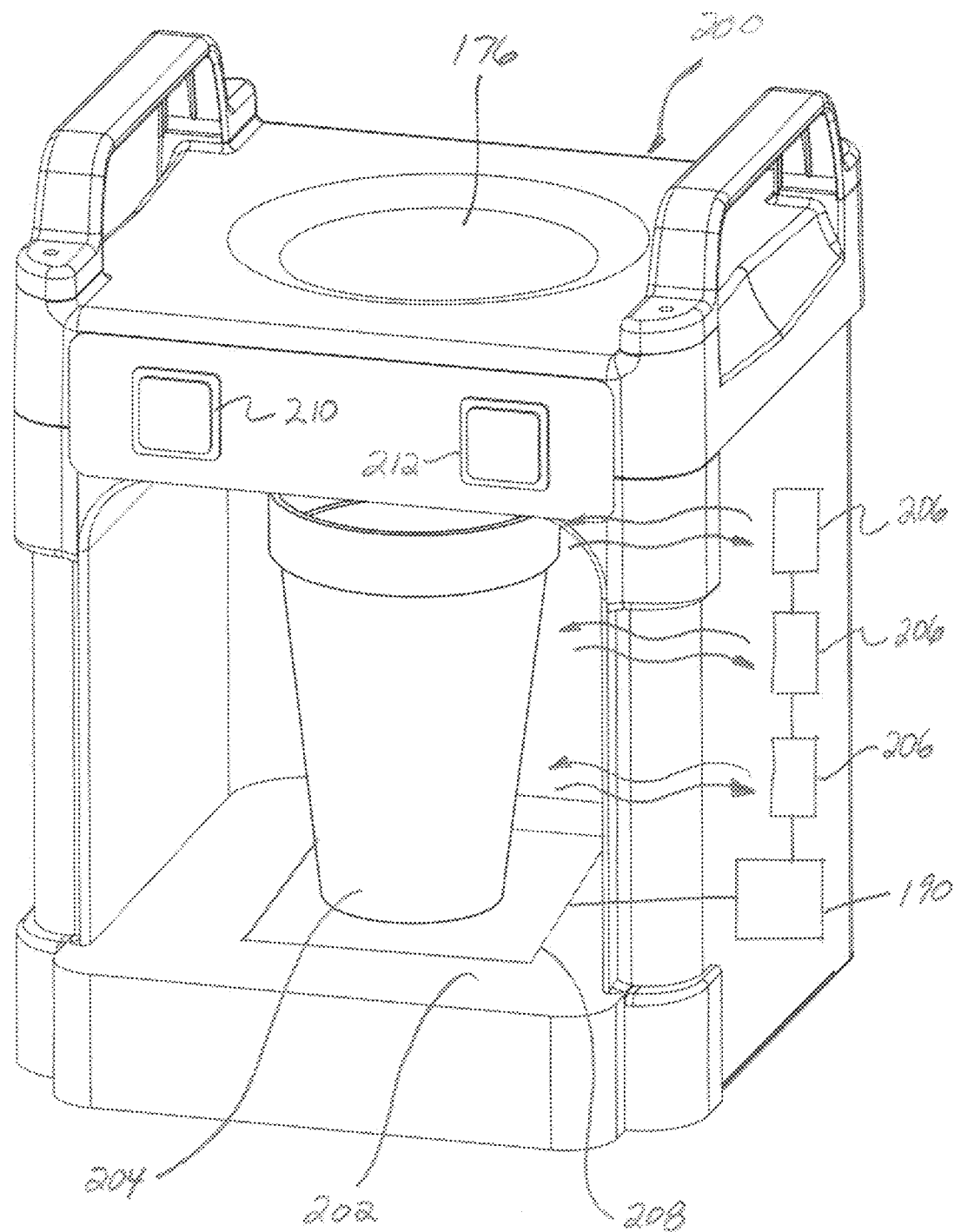
FIG. 22 is a perspective view of an optional single cup brew station for use with the beverage maker of the invention.
Figure 23:
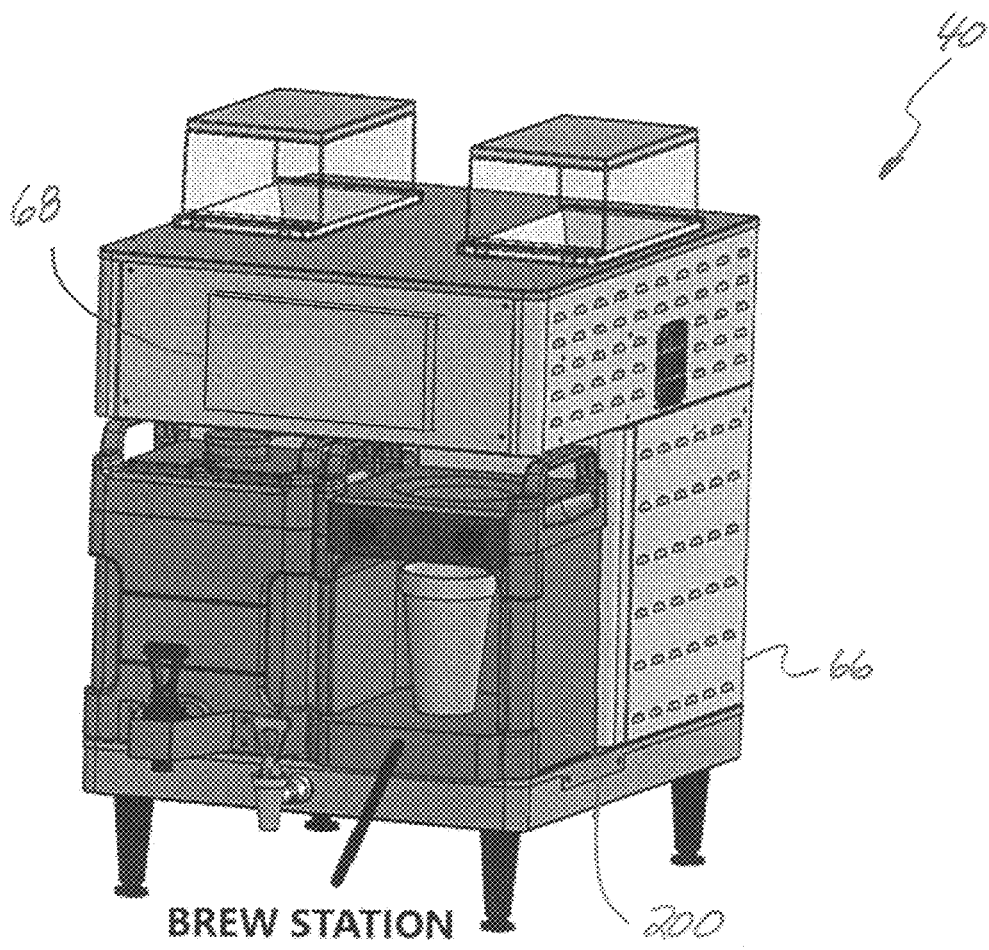
FIG. 23 is a perspective view of the beverage maker of the invention showing the single cup brew station in place of a storage and delivery container.

Referring also to FIGS. 22 and 23, a single serve beverage station 200 is shown that can be utilized with beverage maker 40, in place of either of the previously described receiving containers on housing 66. Either of the beverage making devices described above can be operated by controller 68 to make a single serving of the beverage, e.g., a single batch of a selected size, for dispensing into a single serving container 204 of a corresponding size located on a platform 202 of station 200 disposed below that beverage making device. Beverage station 200 has an inlet opening 176 disposed at the location of the corresponding opening of the other receiving containers, e.g., decanters 46, for receiving the beverage from the associated beverage making device and disposed above a platform 202 for dispensing the beverage into a container 204 thereon. Station 200 additionally preferably includes a sensor or sensors to 206 and/or 208, for detecting presence and size of a selected single serving container 204. As non-limiting examples, one or more of sensors 206 can detect height of a container 204, e.g., small, medium, large, optically, ultrasonically, etc., as denoted by the wavy arrows; and a sensor 208 can comprise a pressure pad operable for sensing the weight of container 204, including when empty, filling, and full. Each of the sensors 206 and 208 will be connected to a communications interface 190, for sending container information to controller 68. Station 200 can additionally include a manual start button 210 and/or a beverage complete indicator light 212 in a conspicuous location, in connection with pressure pad 208, and/or communications interface 190, for initiating beverage making and indicating completion.

In light of all the foregoing, it should thus be apparent to those skilled in the art that there has been shown and described an autonomous rapid batch beverage maker, system, and method that provides one or more of the advantages and overcomes one or more of the limitations, set forth above. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An autonomous beverage making system, comprising:
a beverage making device comprising a sidewall bounding a beverage making chamber, a beverage making substance delivery opening through which a beverage making substance or substances can be delivered into the beverage making chamber, an upper closure member supported on the beverage making device for movement between a closed position in closing relation to the beverage making substance delivery opening so as to be in a closed state, and an open position removed from the beverage making substance delivery opening so as to be in an open state, a drain conduit through which the beverage can be drained from the beverage making chamber, a filter platform disposed in the beverage making chamber separating the beverage making substance delivery opening from the drain conduit, a liquid medium delivery conduit having openings disposed about the beverage making substance delivery opening for directing a liquid beverage making medium into the beverage making chamber onto and about the sidewall for mixing with the beverage making substance or substances delivered into the beverage making chamber to make a batch of the beverage, the filter platform comprising a filter medium permeable to the liquid medium, the air or gas, and the beverage, and impermeable to remnants of the beverage making substance or substances from the making of the beverage, the drain conduit having an outlet;
a beverage making substance delivery mechanism controllably operable to direct the beverage making substance or substances through the beverage making substance delivery opening into the beverage making chamber;
a liquid medium delivery mechanism controllably operable to direct a flow of the liquid beverage making medium through the liquid medium delivery conduit and the openings thereof into the beverage making chamber;
a multiple port valve having a first port connected to an air or gas moving system, a second port connected by the drain conduit to the beverage making chamber, and a third port connected to the outlet of the drain conduit, a controller connected in operative control of the multiple port valve, the upper closure member, the liquid medium delivery mechanism, and the beverage making substance material delivery mechanism, the controller, responsive to an input signal and with the beverage making substance delivery opening in an open state, automatically controlling:
  the liquid medium delivery mechanism to direct a predetermined initial quantity of the liquid medium into the beverage making chamber, and at the same or immediately thereafter, the beverage making substance material delivery mechanism to deliver all or a portion of a predetermined quantity of the beverage making substance or substances through the beverage making substance delivery opening into the beverage making chamber and the multiple port valve to operate in a first operating state together with the air or gas moving system to move air or gas through the drain conduit into the beverage making chamber so as to pass through the filter platform to agitate the liquid medium to mix with and suspend the beverage making substance or substances above the filter platform to make a quantity of a liquid beverage extract concentrate while gases escape from the beverage making chamber through the beverage making substance delivery opening; and then
  the upper closure member to change the beverage making substance delivery opening to a closed state, and
  the multiple port valve to change to a second operating state to cease the movement of the air or gas through the drain conduit and open the drain conduit to allow flow from the beverage making chamber to the outlet, while or followed by controlling the liquid medium delivery mechanism to directing a predetermined second quantity of the liquid medium into the beverage making chamber to mix with the beverage making substance or substances to make a quantity of a dilute liquid beverage extract and force the liquid beverage extract concentrate through the filter platform and from the beverage making chamber through the drain conduit; and then
  drain the dilute liquid beverage extract through the filter platform and the drain conduit.

2. The autonomous beverage making system of claim 1, further comprising a source of pressurized air or gas automatically controlled to direct a flow of the pressurized air or gas into the beverage making chamber to force the dilute liquid beverage extract through the filter platform and the drain conduit as part of the draining of the dilute liquid beverage extract.

3. The autonomous beverage making system of claim 1, further comprising a source of pressurized air or gas automatically controlled to direct a flow of the pressurized air or gas into the beverage making chamber after the draining of the dilute liquid beverage extract, to dry the remnants of the beverage making substance or substances on the filter platform.

4. The autonomous beverage making system of claim 1, wherein the beverage making substance delivery opening is disposed above the filter platform so that the delivered predetermined quantity of the beverage making substance or substances will be dispersed into the liquid medium through which the air of gas is bubbling, above the filter platform.

5. The autonomous beverage making system of claim 1, wherein at one or more times during the mixing of the second quantity of the liquid medium with the beverage making substance or substances to make the quantity of the dilute liquid beverage extract, the controller automatically operates the multiple port valve to changed to the first operating state to bubble the air or gas through the drain conduit into the beverage making chamber and through the second quantity of the liquid medium and the beverage making substance or substances.

6. The autonomous beverage making system of claim 1, wherein the housing of the beverage making device comprises a lower opening communicating with the beverage making chamber, a lower closure member supported for movement between a closed position in closing relation to the lower opening, and an open position removed from the lower opening, the lower closure member carrying the filter platform so as to be disposed between the beverage making substance delivery opening and the drain when the lower closure member is in the closed position.

7. The autonomous beverage making system of claim 6, further comprising a wiper for wiping the remnants of the beverage making substance or substances from the filter platform when the lower closure member is in the open position or moving between the closed position and the open position.

8. The autonomous beverage making system of claim 1, comprising a receiving container disposed for receiving and mixing the quantity of the liquid beverage extract concentrate and the quantity of the dilute liquid beverage extract, the beverage making chamber having a predetermined volume, and the receiving container having a volume that is at least one multiple greater than the volume of the brewing chamber.

9. The autonomous beverage making system of claim 8, further comprising automatically repeating the directing of the predetermined second quantity of the liquid medium into the beverage making chamber to mix with the beverage making substance or substances to make a quantity of a dilute liquid beverage extract and forcing the liquid beverage extract concentrate through the filter platform and from the beverage making chamber through the drain conduit, to fill the receiving container.

10. The autonomous beverage making system of claim 1, wherein the liquid medium comprises hot water and the beverage making substance or substances comprise ground coffee or tea.

11. The autonomous beverage making system of claim 1, comprising a receiving container disposed for receiving and mixing the quantity of the liquid beverage extract concentrate and the quantity of the dilute liquid beverage extract to complete a batch of the beverage, and at least one sensor associated with the receiving container and operable to output a signal representing an amount of the beverage in the receiving container to the controller.

12. The autonomous beverage making system of claim 11, wherein the at least one sensor associated with the receiving container comprises at least one Hall effect sensor, and the receiving container comprises a float configured to be sensed by the at least one Hall effect sensor to determine the amount of the beverage in the receiving container.

13. The autonomous beverage making system of claim 12, wherein the at least one Hall effect sensor comprises a plurality of the Hall effect sensors arranged in an upwardly and downwardly extending array and individually operable to sense vertical positions of the float and output signals representative thereof.

14. The autonomous beverage making system of claim 13, wherein the receiving container has an interior having a predetermined shape when viewed from above or below, the plurality of the Hall effect sensors arranged in the upwardly and downwardly extending array are located beside a predetermined region of the predetermined shape, and the float has a shape when viewed from above and below that matches the predetermined shape sufficiently to only be receivable in the interior in a manner to position an element on the float to be sensed individually by the Hall effect sensors.

15. The autonomous beverage making system of claim 1, comprising a receiving container disposed for receiving and mixing the quantity of the liquid beverage extract concentrate and the quantity of the dilute liquid beverage extract to complete a batch of the beverage, and a timer configured to determine a period of time that the batch of the beverage has been present in the container and output a signal representing the period of time to a communications device to alert an attendant of an age of the beverage in the container.

16. The autonomous beverage making system of claim 1, wherein the beverage making substance delivery mechanism comprises a beverage making substance grinder.

17. The autonomous beverage making system of claim 1, wherein the beverage making substance delivery mechanism comprises a conveyor.

18. The autonomous beverage making system of claim 1, comprising multiple holding containers of the beverage making substance or substances, and the beverage making substance delivery mechanism comprises at least one conveyor controllably operable to automatically selectably deliver the predetermined quantity of the beverage making substance or substances from one or ones of the holding containers through the beverage making substance delivery opening into the beverage making chamber.

19. The autonomous beverage making system of claim 1, comprising a receiving container disposed for receiving and mixing the quantity of the liquid beverage extract concentrate and the quantity of the dilute liquid beverage extract to complete a batch of the beverage, and configured for dispensing quantities of the beverage, and at least one sensor associated with the receiving container and operable to output a signal representing an amount of the beverage dispensed.

20. An autonomous beverage making system, comprising:
a beverage making device comprising a sidewall bounding a beverage making chamber, a beverage making substance delivery opening through which a beverage making substance or substances can be delivered into the beverage making chamber, an upper closure member supported on the beverage making device for movement between a closed position in closing relation to the beverage making substance delivery opening so as to be in a closed state, and an open position removed from the beverage making substance delivery opening so as to be in an open state, a drain conduit through which the beverage can be drained from the beverage making chamber, a filter platform disposed in the beverage making chamber separating the beverage making substance delivery opening from the drain conduit, a liquid medium delivery conduit having openings disposed about the beverage making substance delivery opening for directing a liquid beverage making medium into the beverage making chamber onto and about the sidewall for mixing with the beverage making substance or substances delivered into the beverage making chamber to make a batch of the beverage, the filter platform comprising a filter medium permeable to the liquid medium, the air or gas, and the beverage, and impermeable to remnants of the beverage making substance or substances from the making of the beverage, the drain conduit having an outlet;

a beverage making substance delivery mechanism controllably operable to direct the beverage making substance or substances through the beverage making substance delivery opening into the beverage making chamber;

a liquid medium delivery mechanism controllably operable to direct a flow of the liquid beverage making medium through the liquid medium delivery conduit and the openings thereof into the beverage making chamber;

a multiple port valve having a first port connected to an air or gas moving system, a second port connected by the drain conduit to the beverage making chamber, and a third port connected to the outlet of the drain conduit, a controller connected in operative control of the multiple port valve, the upper closure member, the liquid medium delivery mechanism, and the beverage making substance material delivery mechanism, the controller, responsive to an input signal and with the beverage making substance delivery opening in an open state, automatically controlling:

the liquid medium delivery mechanism to direct a predetermined initial quantity of the liquid medium into the beverage making chamber, and at the same or immediately thereafter, the beverage making substance material delivery mechanism to deliver all or a portion of a predetermined quantity of the beverage making substance or substances through the beverage making substance delivery opening into the beverage making chamber and the multiple port valve to operate in a first operating state together with the air or gas moving system to move air or gas through the drain conduit into the beverage making chamber so as to pass through the filter platform to agitate the liquid medium to mix with and suspend the beverage making substance or substances above the filter platform to make a quantity of a liquid beverage extract concentrate while gases escape from the beverage making chamber through the beverage making substance delivery opening; and then the upper closure member to change the beverage making substance delivery opening to a closed state, and the multiple port valve to change to a second operating state to cease the movement of the air or gas through the drain conduit and open the drain conduit to allow flow from the beverage making chamber to the outlet, while or followed by controlling the liquid medium delivery mechanism to direct a predetermined second quantity of the liquid medium into the beverage making chamber to mix with the beverage making substance or substances to make a quantity of a dilute liquid beverage extract and force the liquid beverage extract concentrate through the filter platform and from the beverage making chamber through the drain conduit; and then drain the dilute liquid beverage extract through the filter platform and the drain conduit;

and a receiving container disposed for receiving and mixing the quantity of the liquid beverage extract concentrate and the quantity of the dilute liquid beverage extract to complete a batch of the beverage, and a timer configured to determine a period of time that the batch of the beverage has been present in the container and output a signal representing the period of time to a communications device to alert an attendant of an age of the beverage in the container.

21. The autonomous beverage making system of claim 20, further comprising a source of pressurized air or gas automatically controlled to direct a flow of the pressurized air or gas into the beverage making chamber to force the dilute liquid beverage extract through the filter platform and the drain conduit as part of the draining of the dilute liquid beverage extract.

22. The autonomous beverage making system of claim 20, comprising at least one sensor associated with the receiving container and operable to output a signal representing an amount of the beverage dispensed.

23. The autonomous beverage making system of claim 20, wherein the beverage making substance delivery opening is disposed above the filter platform so that the delivered predetermined quantity of the beverage making substance or substances will be dispersed into the liquid medium through which the air of gas is bubbling, above the filter platform.

24. The autonomous beverage making system of claim 20, wherein at one or more times during the mixing of the second quantity of the liquid medium with the beverage making substance or substances to make the quantity of the dilute liquid beverage extract, the controller automatically operates the multiple port valve to change to the first operating state to bubble the air or gas through the drain conduit into the beverage making chamber and through the second quantity of the liquid medium and the beverage making substance or substances.

25. The autonomous beverage making system of claim 20, wherein the liquid medium comprises hot water and the beverage making substance or substances comprise ground coffee or tea.

26. The autonomous beverage making system of claim 20, comprising at least one sensor associated with the receiving container and operable to output a signal representing an amount of the beverage in the receiving container.

27. The autonomous beverage making system of claim 26, wherein the at least one sensor associated with the receiving container operable to output a signal representing an amount of the beverage in the receiving container comprises at least one Hall effect sensor, and the receiving container comprises a float configured to be sensed by the at least one Hall effect sensor to determine the amount of the beverage in the receiving container.

28. The autonomous beverage making system of claim 27, wherein the at least one Hall effect sensor comprises a plurality of the Hall effect sensors arranged in an upwardly and downwardly extending array and individually operable to sense vertical positions of the float and output signals representative thereof.

29. The autonomous beverage making system of claim 28, wherein the receiving container has an interior having a predetermined shape when viewed from above or below, the plurality of the Hall effect sensors arranged in the upwardly and downwardly extending array are located beside a predetermined region of the predetermined shape, and the float has a shape when viewed from above and below that matches the predetermined shape sufficiently to only be receivable in the interior in a manner to position an element on the float to be sensed individually by the Hall effect sensors.

30. An autonomous beverage making system, comprising:
a beverage making device comprising a sidewall bounding a beverage making chamber, a beverage making substance delivery opening through which a beverage making substance or substances can be delivered into the beverage making chamber, an upper closure member supported on the beverage making device for movement between a closed position in closing relation to the beverage making substance delivery opening so as to be in a closed state, and an open position such that the beverage making substance delivery opening is in an open state, a drain conduit through which the beverage can be drained from the beverage making chamber, a filter platform disposed in the beverage making chamber separating the beverage making substance delivery opening from the drain conduit, a liquid medium delivery conduit having openings disposed about the beverage making substance delivery opening for directing a liquid beverage making medium into the beverage making chamber onto and about the sidewall for mixing with the beverage making substance or substances delivered into the beverage making chamber to make a batch of the beverage, the filter platform comprising a filter medium permeable to the liquid medium, the air or gas, and the beverage, and impermeable to remnants of the beverage making substance or substances from the making of the beverage, the drain conduit having an outlet;
a beverage making substance delivery mechanism controllably operable to direct the beverage making substance or substances through the beverage making substance delivery opening into the beverage making chamber;
a liquid medium delivery mechanism controllably operable to direct a flow of the liquid beverage making medium through the liquid medium delivery conduit and the openings thereof into the beverage making chamber;
a multiple port valve having a first port connected to an air or gas moving system, a second port connected by the drain conduit to the beverage making chamber, and a third port connected to the outlet of the drain conduit, a controller connected in operative control of the multiple port valve, the upper closure member, the liquid medium delivery mechanism, and the beverage making substance material delivery mechanism, the controller, responsive to an input signal and with the beverage making substance delivery opening in an open state, automatically controlling:
the liquid medium delivery mechanism to direct a predetermined initial quantity of the liquid medium into the beverage making chamber, and at the same or immediately thereafter, the beverage making substance material delivery mechanism to deliver all or a portion of a predetermined quantity of the beverage making substance or substances through the beverage making substance delivery opening into the beverage making chamber and the multiple port valve to operate in a first operating state together with the air or gas moving system to move air or gas through the drain conduit into the beverage making chamber so as to pass through the filter platform to agitate the liquid medium to mix with and suspend the beverage making substance or substances above the filter platform to make a quantity of a liquid beverage extract concentrate while gases escape from the beverage making chamber through the beverage making substance delivery opening; and then the upper closure member to change the beverage making substance delivery opening to a closed state, and the multiple port valve to change to a second operating state to cease the movement of the air or gas through the drain conduit and open the drain conduit to allow flow from the beverage making chamber to the outlet, while or followed by controlling the liquid medium delivery mechanism to direct a predetermined second quantity of the liquid medium into the beverage making chamber to mix with the beverage making substance or substances to make a quantity of a dilute liquid beverage extract and force the liquid beverage extract concentrate through the filter platform and from the beverage making chamber through the drain conduit; and then drain the dilute liquid beverage extract through the filter platform and the drain conduit;

and a receiving container disposed for receiving and mixing the quantity of the liquid beverage extract concentrate and the quantity of the dilute liquid beverage extract to complete a batch of the beverage, and at least one sensor associated with the receiving container and operable to output a signal representing an amount of the beverage in the receiving container to the controller.

31. The autonomous beverage making system of claim 30, comprising at least one sensor associated with the receiving container and operable to output a signal representing an amount of the beverage dispensed.

32. The autonomous beverage making system of claim 30, wherein at one or more times during the mixing of the second quantity of the liquid medium with the beverage making substance or substances to make the quantity of the dilute liquid beverage extract, the controller automatically operates the multiple port valve to change to the first operating state to bubble the air or gas through the drain conduit into the beverage making chamber and through the second quantity of the liquid medium and the beverage making substance or substances.

33. The autonomous beverage making system of claim 30, wherein the liquid medium comprises hot water and the beverage making substance or substances comprise ground coffee or tea.

34. The autonomous beverage making system of claim 30, comprising multiple holding containers of the beverage making substance or substances, and the beverage making substance delivery mechanism comprises at least one conveyor controllably operable to automatically selectably deliver the predetermined quantity of the beverage making substance or substances from one or ones of the holding containers through the beverage making substance delivery opening into the beverage making chamber.

35. The autonomous beverage making system of claim 30, wherein the at least one sensor associated with the receiving container comprises at least one Hall effect sensor, and the receiving container comprises a float configured to be sensed by the at least one Hall effect sensor to determine the amount of the beverage in the receiving container.

36. The autonomous beverage making system of claim 30, comprising a timer configured to determine a period of time that a batch of the beverage has been present in the receiving container and output a signal representing the period of time to a communications device to alert an attendant of an age of the beverage in the receiving container.

37. The autonomous beverage making system of claim 30, wherein the at least one sensor associated with the receiving container and operable to output a signal representing an amount of the beverage in the receiving container to the controller, or the controller, is configured to output the signal representing the amount of the beverage in the receiving container to an attendant.

* * * * *